US011966139B2

(12) United States Patent
Ura et al.

(10) Patent No.: US 11,966,139 B2
(45) Date of Patent: Apr. 23, 2024

(54) ELECTROCHROMIC ELEMENT, AND METHOD FOR DRIVING THE SAME

(71) Applicant: Ricoh Company, Ltd., Tokyo (JP)

(72) Inventors: Naoki Ura, Kanagawa (JP); Fuminari Kaneko, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 48 days.

(21) Appl. No.: 17/375,151

(22) Filed: Jul. 14, 2021

(65) Prior Publication Data

US 2022/0035216 A1 Feb. 3, 2022

(30) Foreign Application Priority Data

Jul. 31, 2020 (JP) ................................ 2020-131051
Jun. 16, 2021 (JP) ................................ 2021-100010

(51) Int. Cl.
*G02F 1/155* (2006.01)
*G02F 1/1503* (2019.01)
(Continued)

(52) U.S. Cl.
CPC .......... *G02F 1/1503* (2019.01); *G02F 1/1525* (2013.01)

(58) Field of Classification Search
CPC ...... G02F 1/155; G02F 1/1503; G02F 1/1525; G09G 3/19
See application file for complete search history.

(56) References Cited

U.S. PATENT DOCUMENTS 5,215,684 A 6/1993 Okabayashi et al.
6,509,999 B1 1/2003 Shelepin et al.
(Continued)

FOREIGN PATENT DOCUMENTS

JP 53-075951 7/1978
JP 63-153524 6/1988
(Continued)

OTHER PUBLICATIONS

Extended European Search Report dated Nov. 18, 2021 in European Patent Application No. 21186403.8, 13 pages.
(Continued)

*Primary Examiner* — Bijan Ahvazi
(74) *Attorney, Agent, or Firm* — XSENSUS LLP

(57) ABSTRACT

Provided is an electrochromic element including: a first electrode; a second electrode apart from and opposite to the first electrode; an electrolyte layer between the first electrode and the second electrode, containing an oxidizable substance or a reducible substance, or both; and at least one of an oxidizable electrochromic layer between the first electrode and the electrolyte layer, containing an oxidizable electrochromic compound, and a reducible electrochromic layer between the second electrode and the electrolyte layer, containing a reducible electrochromic compound, wherein an oxidation potential of the oxidizable substance is nobler than an oxidation potential of the oxidizable electrochromic compound, a reduction potential of the reducible substance is baser than a reduction potential of the reducible electrochromic compound, an oxidation reaction of the oxidizable substance is irreversible, and a reduction reaction of the reducible substance is irreversible.

4 Claims, 2 Drawing Sheets

201
1
6
5
9
2

(51) Int. Cl.
*G02F 1/1523* (2019.01)
*G09G 3/19* (2006.01)

(56) References Cited

U.S. PATENT DOCUMENTS

| | | | | |
|---|---|---|---|---|
| 2011/0045172 | A1 | 2/2011 | Varaprasad et al. | |
| 2011/0141544 | A1* | 6/2011 | Suzuki | C09K 9/02 359/273 |
| 2016/0209721 | A1 | 7/2016 | Matsumoto et al. | |
| 2017/0010514 | A1 | 1/2017 | Yashiro et al. | |
| 2017/0168366 | A1 | 6/2017 | Shinoda et al. | |
| 2017/0329197 | A1 | 11/2017 | Yashiro et al. | |
| 2017/0329198 | A1 | 11/2017 | Matsuoka et al. | |
| 2018/0044581 | A1 | 2/2018 | Sagisaka et al. | |
| 2018/0113366 | A1 | 4/2018 | Kaneko et al. | |
| 2018/0173070 | A1 | 6/2018 | Yamamoto et al. | |
| 2019/0171077 | A1* | 6/2019 | Kubo | G02F 1/1503 |
| 2019/0285960 | A1 | 9/2019 | Sasa et al. | |
| 2019/0310530 | A1 | 10/2019 | Kaneko et al. | |
| 2019/0324338 | A1* | 10/2019 | Takauji | G02F 1/15165 |
| 2020/0089070 | A1 | 3/2020 | Yamamoto et al. | |
| 2020/0103718 | A1 | 4/2020 | Okada et al. | |
| 2020/0117066 | A1* | 4/2020 | Lee | G02F 1/1533 |
| 2020/0301226 | A1 | 9/2020 | Yashiro et al. | |
| 2020/0409182 | A1 | 12/2020 | Endoh et al. | |

FOREIGN PATENT DOCUMENTS

| | | | | |
|---|---|---|---|---|
| JP | 2-061622 | | 3/1990 | |
| JP | 5-100628 | | 4/1993 | |
| JP | 5-108024 | | 4/1993 | |
| JP | 2010204438 | A * | 9/2010 | G02F 1/15 |
| JP | 2012-083788 | | 4/2012 | |
| JP | 2016-218359 | | 12/2016 | |
| JP | 2018-022131 | | 2/2018 | |
| JP | 2019-095811 | | 6/2019 | |
| WO | 2009/099185 | A1 | 8/2009 | |

OTHER PUBLICATIONS

Office Action issued Feb. 22, 2024 in European Patent Application No. 21 186 403.8, 9 pages.

* cited by examiner

ELECTROCHROMIC ELEMENT, AND METHOD FOR DRIVING THE SAME

CROSS-REFERENCE TO RELATED APPLICATIONS

This patent application is based on and claims priority pursuant to 35 U.S.C. § 119(a) to Japanese Patent Application Nos. 2020-131051 and 2021-100010, filed on Jul. 31, 2020 and Jun. 16, 2021, respectively, in the Japan Patent Office, the entire disclosure of which is hereby incorporated by reference herein.

BACKGROUND

Technical Field

The present disclosure relates to an electrochromic element, and a method for driving the same.

Description of the Related Art

Electrochromism is a phenomenon that in response to application of a voltage, a substance undergoes an oxidation-reduction reaction reversibly and changes colors. Electrochromism is the subject of extensive research and development because electrochromism can be utilized for, for example, light control and signage.

Electrochromic elements (hereinafter, "electrochromic" may be described as "EC") utilizing electrochromism typically include an ionic conductive electrolyte layer between two opposite electrodes, and are allowed to undergo an oxidation-reduction reaction by application of a voltage across the electrodes.

When a reduction reaction occurs in the surface of one of the two opposite electrodes, an oxidation reaction, which is the reverse reaction, occurs in the surface of the other electrode.

One of the problems of the EC elements is color remaining, which is the failure to return to the initial state when the EC elements are driven to return to the initial state after the EC elements in the initial state is driven to change colors. When the EC elements are used for light control, color remaining spoils reliability of the EC elements.

SUMMARY

According to an aspect of the present disclosure, an electrochromic element includes: a first electrode; a second electrode apart from and opposite to the first electrode; an electrolyte layer between the first electrode and the second electrode, containing an oxidizable substance or a reducible substance, or both; and at least one of an oxidizable electrochromic layer between the first electrode and the electrolyte layer, containing an oxidizable electrochromic compound, and a reducible electrochromic layer between the second electrode and the electrolyte layer, containing a reducible electrochromic compound. An oxidation potential of the oxidizable substance is nobler than an oxidation potential of the oxidizable electrochromic compound. A reduction potential of the reducible substance is baser than a reduction potential of the reducible electrochromic compound. An oxidation reaction of the oxidizable substance is irreversible. A reduction reaction of reducible substance is irreversible.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
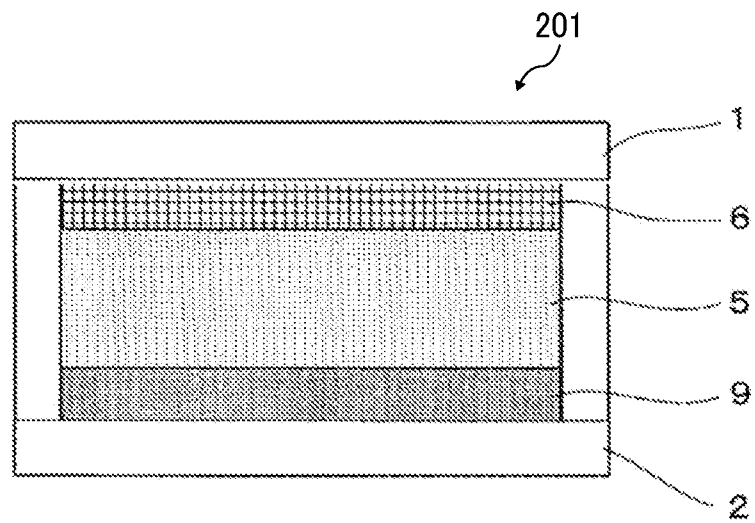
FIG. 1 is a schematic cross-sectional view of an electrochromic element according to a first embodiment of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

The present disclosure can provide an electrochromic element that has a high memory performance and has no color remaining.

When an electrochromic element has no color remaining, it means that the electrochromic element can maintain the colors of a color developed state and a decolorized state through repeated driving.

(Electrochromic Element)

An electrochromic element of the present disclosure includes a first electrode, a second electrode, an electrolyte layer, and electrochromic layers, and further includes other members as needed.

An electrochromic element according to a first embodiment of the present disclosure includes a first electrode; a second electrode apart from and opposite to the first electrode; an electrolyte layer between the first electrode and the second electrode, containing an oxidizable substance or a reducible substance, or both; an oxidizable electrochromic layer between the first electrode and the electrolyte layer, containing an oxidizable electrochromic compound; and a reducible electrochromic layer between the second electrode and the electrolyte layer, containing a reducible electrochromic compound. An oxidation potential of the oxidizable substance is nobler than an oxidation potential of the oxidizable electrochromic compound. A reduction potential of the reducible substance is baser than a reduction potential of the reducible electrochromic compound. An oxidation reaction of the oxidizable substance is irreversible. A reduction reaction of reducible substance is irreversible. The electrochromic element further includes other members as needed. The electrochromic element according to the first embodiment is referred to also as complementary electrochromic element.

An electrochromic element according to a second embodiment of the present disclosure includes a first electrode; a second electrode apart from and opposite to the first electrode; an electrolyte layer between the first electrode and the second electrode, containing an oxidizable substance; and an oxidizable electrochromic layer between the first electrode and the electrolyte layer, containing an oxidizable electrochromic compound. An oxidation potential of the oxidizable substance is nobler than an oxidation potential of the oxidizable electrochromic compound. An oxidation reaction of the oxidizable substance is irreversible. The electrochromic element further includes other members as needed. The electrochromic element according to the second embodiment is referred to also as oxidation-type electrochromic element.

An electrochromic element according to a third embodiment of the present disclosure includes a first electrode; a second electrode apart from and opposite to the first electrode; an electrolyte layer between the first electrode and the second electrode, containing a reducible substance; and a reducible electrochromic layer between the second electrode and the electrolyte layer, containing a reducible electrochromic compound. A reduction potential of the reducible substance is baser than a reduction potential of the reducible electrochromic compound. A reduction reaction of the reducible substance is irreversible. The electrochromic element further includes other members as needed. The electrochromic element according to the third embodiment is referred to also as reduction-type electrochromic element.

EC elements that have no color remaining have been studied so far. For example, a complementary EC element has been proposed that is obtained by dissolving an EC compound in an electrolyte, wherein the EC element contains an oxidizable substance that is more oxidizable than an oxidizable EC compound or a reducible substance that is more reducible than a reducible EC compound. This EC element can overcome color remaining, but has a problem that it has a poor response in color development and decolorization, a poor memory performance, and a high power consumption because the EC compound is not carried over the surface of an electrode.

As another example, an EC element has been provided containing in an electrolyte, an oxidizable substance that is less oxidizable than a reversible oxidation reaction of an oxidizable EC compound and more oxidizable than an irreversible oxidation reaction of the oxidizable EC compound, and a reducible substance that is less reducible than a reversible reduction reaction of a reducible EC compound and more reducible than an irreversible reduction reaction of the reducible EC compound. In response to sensing color remaining, this EC element causes the oxidizable-reducible substances to undergo an oxidation-reduction reaction by application of a voltage higher than a color developing voltage, and then resolves color remaining by application of a decolorizing voltage. However, this method needs to sense color remaining, and needs to once experience a densely color developed state after the color remaining state in order to resolve color remaining. This method also needs to sense again whether color remaining has been resolved successfully or not, and not only spoils the appearance but also needs complicated control. Besides, Examples only present EC elements in which an EC compound is dissolved in an electrolytic solution, but do not present EC elements in which an EC compound is carried over the surface of an electrode.

As a result of earnest studies, the present inventors have found it possible to return an EC element to an initial state by adding a substance containing an oxidizable substance or a reducible substance in the electrolyte layer and applying a voltage for returning to the initial state to cause the oxidizable substance or the reducible substance to undergo an oxidation-reduction reaction, which is a pair reaction with an oxidation-reduction reaction that occurs when the EC compound in a color changed state returns to the initial state. As a result, the present inventors have found it possible to produce an EC element in which an EC compound is carried in the form of a layer over an electrode, where the EC element can return to an initial state without sensing a failure to return to the initial state when the EC element has failed to return to the initial state after driven to return to the initial state. In this way, the present inventors have completed the present disclosure.

An electrochromic element of the present disclosure will be described with reference to the drawings.

FIG. 1 is a schematic view illustrating an example of an electrochromic element 201 according to the first embodiment.

The electrochromic element 201 includes a first electrode 1 and a second electrode 2 opposed to the first electrode 1. The electrochromic element 201 further includes an oxidizable electrochromic layer 6, an electrolyte layer 5, and a reducible electrochromic layer 9 between the first electrode 1 and the second electrode 2. The electrolyte layer 5 contains an oxidizable substance or a reducible substance, or both. The oxidizable substance and the reducible substance may be a single substance utilizing, for example, a chemical bond. The electrochromic element 201 may include other members as needed.

In the method for driving the electrochromic element according to the first embodiment, through a step P1 of applying across the first electrode 1 and the second electrode 2 of the electrochromic element 201, a voltage higher than a threshold voltage Vc needed for the electrochromic element to change colors from the initial state, an oxidizable electrochromic compound contained in the oxidizable electrochromic layer 6 undergoes an oxidation reaction to cause the oxidizable electrochromic layer 6 to change colors, and a reducible electrochromic compound contained in the reducible electrochromic layer 9 undergoes a reduction reaction to cause the reducible electrochromic layer 9 to change colors. In this way, a color changed state of the electrochromic element 201 is obtained. Through a step P2 of applying a voltage for returning the color changed state to the initial state, the oxidized body of the oxidizable electrochromic compound undergoes a reduction reaction to return to the original oxidizable electrochromic compound, and the reduced body of the reducible electrochromic compound undergoes an oxidation reaction to return to the original reducible electrochromic compound. In this way, the electrochromic element 201 can be returned to the initial state.

Figure 2:
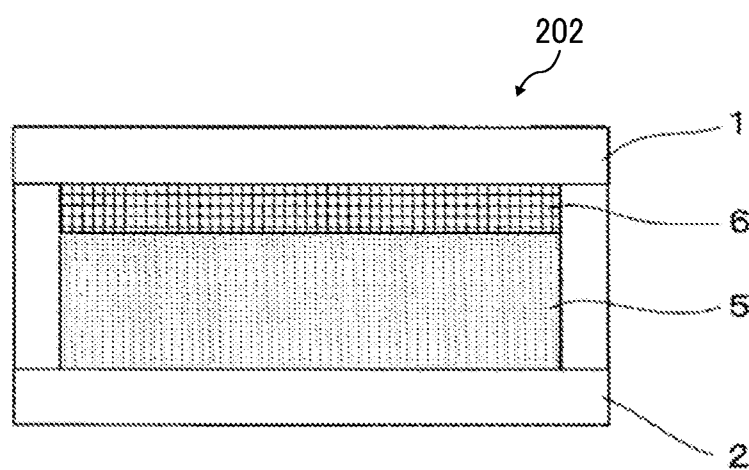
FIG. 2 is a schematic cross-sectional view of an electrochromic element according to a second embodiment of the present disclosure.

FIG. 2 is a schematic view illustrating an example of an electrochromic element 202 according to the second embodiment.

The electrochromic element 202 includes a first electrode 1 and a second electrode 2 opposed to the first electrode 1. The electrochromic element 202 further includes an oxidizable electrochromic layer 6 and an electrolyte layer 5 between the first electrode 1 and the second electrode 2. The electrolyte layer 5 contains an oxidizable substance. The electrochromic element 202 may further include other members as needed.

In the method for driving the electrochromic element according to the second embodiment, through a step P1 of applying across the first electrode 1 and the second electrode 2 of the electrochromic element 202, a voltage higher than a threshold voltage Vc needed for the electrochromic element to change colors from the initial state, an oxidizable electrochromic compound contained in the oxidizable electrochromic layer 6 undergoes an oxidation reaction to cause the oxidizable electrochromic layer 6 to change colors. In this way, a color changed state of the electrochromic element 202 is obtained. Through a step P2 of applying a voltage for returning the color changed state to the initial state, the oxidized body of the oxidizable electrochromic compound undergoes a reduction reaction to return to the original oxidizable electrochromic compound. In this way, the electrochromic element 202 can be returned to the initial state.

Figure 3:
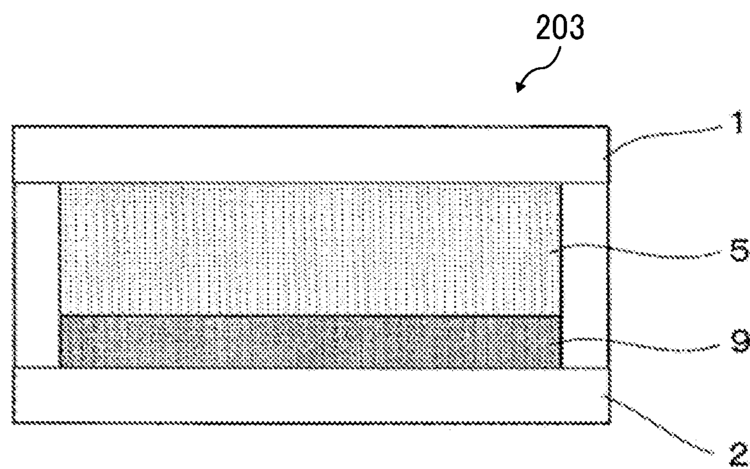
FIG. 3 is a schematic cross-sectional view of an electrochromic element according to a third embodiment of the present disclosure.

FIG. 3 is a schematic view illustrating an example of an electrochromic element 203 according to the third embodiment.

The electrochromic element 203 includes a first electrode 1 and a second electrode 2 opposed to the first electrode 1. The electrochromic element 203 further includes a reducible electrochromic layer 9 and an electrolyte layer 5 between the first electrode 1 and the second electrode 2. The electrolyte layer 5 contains a reducible substance. The electrochromic element 203 may further includes other members as needed.

In the method for driving the electrochromic element according to the third embodiment, through a step P1 of applying across the first electrode 1 and the second electrode 2 of the electrochromic element 203, a voltage higher than a threshold voltage Vc needed for the electrochromic element to change colors from the initial state, a reducible electrochromic compound contained in the reducible electrochromic layer 9 undergoes a reduction reaction to cause the reducible electrochromic layer 9 to change colors. In this way, a color changed state of the electrochromic element 203 is obtained. Through a step P2 of applying a voltage for returning the color changed state to the initial state, the reduced body of the reducible electrochromic compound undergoes an oxidation reaction to return to the original reducible electrochromic compound. In this way, the electrochromic element 203 can be returned to the initial state.

<First Electrode and Second Electrode>

The materials of the first electrode and the second electrode are not particularly limited and may be appropriately selected depending on the intended purpose so long as the materials are conductors ordinarily used. A transparent electrode having transparency is preferable.

The transparent electrode is not particularly limited and may be appropriately selected depending on the intended purpose. Examples of the material of the transparent electrode include, but are not limited to, inorganic materials such as tin-doped indium oxide (hereinafter referred to as "ITO"), fluorine-doped tin oxide, antimony-doped tin oxide, and zinc oxide. Among these materials, InSnO, GaZnO, SnO, $In_2O_3$, and ZnO are preferable.

An electrode obtained by forming, for example, transparent carbon nanotube or other highly conductive non-transmissive materials such as Au, Ag, Pt, and Cu into a minute network shape to improve conductivity while maintaining transparency may also be used.

The thickness of each of the first electrode and the second electrode is adjusted in a manner that an electrical resistance value needed for oxidation-reduction reactions of the electrochromic layer can be obtained.

When ITO is used as the materials of the first electrode and the second electrode, the thickness of each of the first electrode and the second electrode is preferably, for example, 50 nm or greater but 500 nm or less.

The method for producing each of the first electrode and the second electrode is not particularly limited and may be appropriately selected depending on the intended purpose. Examples of the method include, but are not limited to, a vacuum vapor deposition method, a sputtering method, and an ion plating method.

When the materials of the first electrode and the second electrode are coatable materials, the method for producing the first electrode and the second electrode is not particularly limited and examples of the method include, but are not limited to, a spin coating method, a casting method, a micro gravure coating method, a gravure coating method, a bar coating method, a roll coating method, a wire bar coating method, a dip coating method, a slit coating method, a capillary coating method, a spray coating method, and a nozzle coating method, and various printing methods such as a gravure printing method, a screen printing method, a flexography method, an offset printing method, a reverse printing method, and an inkjet printing method.

<Electrolyte Layer>

The electrolyte layer is filled between the first electrode and the second electrode.

The electrolyte layer of the electrochromic element of the present disclosure contains an oxidizable substance or a reducible substance, or both, and further contains other components as needed.

The electrolyte layer of the electrochromic element according to the second embodiment of the present disclosure contains an oxidizable substance and further contains other components as needed.

The electrolyte layer of the electrochromic element according to the third embodiment of the present disclosure contains a reducible substance and further contains other components as needed.

—Oxidizable Substance—

The oxidizable substance is a substance that exhibits an electrochemical oxidation reaction.

It is preferable that the oxidation potential of the oxidizable substance be nobler than the oxidation potential of an oxidizable electrochromic compound described below. This is because it is preferable that the oxidizable substance not undergo an oxidation-reduction reaction in normal color development and decolorization drives in which color remaining is absent. With the oxidation potential of the oxidizable substance nobler than the oxidation potential of the oxidizable electrochromic compound, it is possible to suppress the amount by which the oxidizable substance undergoes an oxidation reaction to a low amount when a potential at which the oxidizable electrochromic compound undergoes an oxidation reaction is applied across the electrodes.

When the oxidation potential of the oxidizable substance is baser than the oxidation potential of the oxidizable electrochromic compound, not only does the oxidizable substance undergo an oxidation reaction by normal color development and decolorization drive to degrade the efficiency, but also the oxidizable substance donates electrons to the oxidized body of the oxidizable electrochromic compound to make it impossible for the electrochromic element to maintain a color changed state, leading to degradation of the memory performance.

When the oxidation potential of the oxidizable substance is nobler than the oxidation potential of the oxidizable electrochromic compound, the electrochromic element in a color changed state can maintain the color changed state and can return to the initial state at an arbitrary timing by application of a voltage.

The oxidizable substance that satisfies this condition is different depending on the oxidation potential of the oxidizable electrochromic compound. For example, the oxidation potential of a triarylamine derivative is about from 0.2 V through 0.6 V (vs. ferrocene). Therefore, any functional group that undergoes an oxidation reaction at a potential nobler than this potential can be used. Specific examples of the oxidizable substance include, but are not limited to, pyridines, polycyclic aromatic series, heterocyclic compounds, alkoxy benzenes, cyano benzenes, phosphates, phosphites, and annulenes.

It is preferable that the oxidation reaction of the oxidizable substance be irreversible. "Irreversible" means that the oxidized body obtained through an oxidation reaction of the oxidizable substance is not easily reduced and returned to the original oxidizable substance. "Not easily returned" means that the ratio of the part of the oxidized body to return to the original oxidizable substance is small. The ratio of the part to return to the original oxidizable substance is preferably 1/2 or less, more preferably 1/10 or less, and yet more preferably 1/100 or less.

If the oxidation reaction of the oxidizable substance is reversible, the oxidized body of the oxidizable substance undergoes a reduction reaction when returning to the original oxidizable substance. Therefore, in a complementary electrochromic element like the element according to the first embodiment, the amount by which the reducible electrochromic compound undergoes a reduction reaction decreases by the amount of that reduction reaction. This gives rise to a problem that the tone of the electrochromic element becomes different from what it has been. When the oxidizable substance that has oxidized over the surface of the second electrode reaches the first electrode through the electrolyte layer, the oxidized body of the oxidizable substance and the oxidizable EC compound transfer electrons to each other, and the oxidizable EC compound becomes a color changed state. When the oxidation reaction of the oxidizable substance is irreversible, the problem described above does not occur, and the tone of the color changed state of the electrochromic element remains the same.

Examples of the oxidizable substance that exhibits the irreversible oxidation reaction include, but are not limited to, phenols, alkoxy benzenes, cyano benzenes, phosphates, phosphites, and annulenes.

—Phenols—

Examples of the phenols include, but are not limited to, compounds represented by General formula X1 below.

(General formula X1)

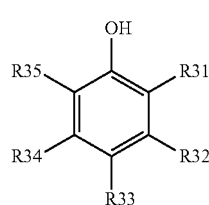

Examples of each of R31 to R35 in General formula X1 include, but are not limited to, a hydrogen atom, a halogen atom, a hydroxyl group, a nitro group, a cyano group, an amide group, a carbonyl group, an alkyl group that may contain a substituent, an aryl group that may contain a substituent, an alkoxy group that may contain a substituent, an aryloxy group that may contain a substituent, an alkylthio group that may contain a substituent, an arylthio group that may contain a substituent, and a heterocyclic group that may contain a substituent. Among these examples, an alkyl group, an alkoxy group, a hydrogen atom, an awl group, an aryloxy group, and a halogen atom are preferable in terms of a stable operation.

Examples of the halogen atom include, but are not limited to, a fluorine atom, a chlorine atom, a bromine atom, and an iodine atom.

Examples of the alkyl group include, but are not limited to, a methyl group, an ethyl group, a propyl group, a butyl group, and a tertially butyl group.

Examples of the aryl group include, but are not limited to, a phenyl group and a naphthyl group.

Examples of the alkoxy group include, but are not limited to, a methoxy group, an ethoxy group, and a propoxy group.

Examples of the aryloxy group include, but are not limited to, a phenoxy group, a 1-naphthyloxy group, a 2-naphthyloxy group, a 4-methoxyphenoxy group, and a 4-methylphenoxy group.

Examples of the heterocyclic group include, but are not limited to, carbazole, dibenzofuran, dibenzothiophene, oxadiazole, and thiadiazole.

Examples of the substituent that is further substituted for the substituent include, but are not limited to, alkyl groups such as a halogen atom, a nitro group, a methyl group, and an ethyl group, alkoxy groups such as a methoxy group and an ethoxy group, aryloxy groups such as a phenoxy group, aryl groups such as a phenyl group and a naphthyl group, and a benzyl group.

Specific examples of the compounds (phenols) represented by General formula X1 include, but are not limited to compounds having the structures presented below. The phenols are not limited to these examples.

[Example compound X1-1]

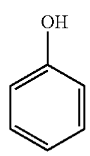

[Example compound X1-2]

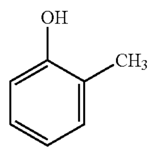

[Example compound X1-3]

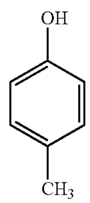

-continued

[Example compound X1-4]

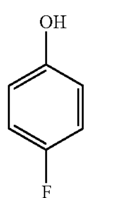

[Example compound X1-5]

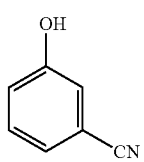

[Example compound X1-6]

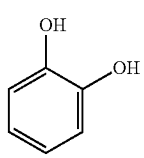

[Example compound X1-7]

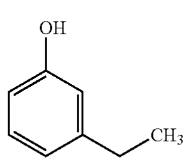

[Example compound X1-8]

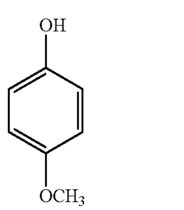

[Example compound X1-9]

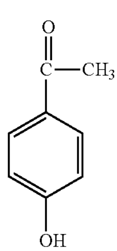

[Example compound X1-10]

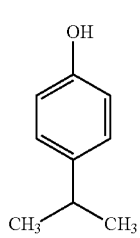

[Example compound X1-11]

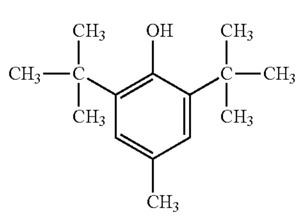

-continued

[Example compound X1-12]

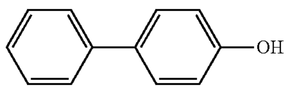

[Example compound X1-13]

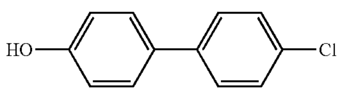

[Example compound X1-14]

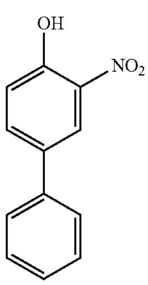

—Alkoxy Benzenes—

Examples of the alkoxy benzenes include, but are not limited to, compounds represented by General formula X2 below.

(General formula X2)

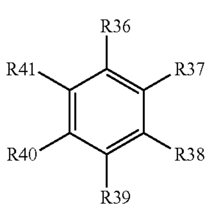

Examples of each of R36 to R41 in General formula X2 include, but are not limited to, a hydrogen atom, a halogen atom, a nitro group, a cyano group, an amide group, a carbonyl group, an alkyl group that may contain a substituent, an aryl group that may contain a substituent, an alkoxy group that may contain a substituent, an aryloxy group that may contain a substituent, an alkylthio group that may contain a substituent, an arylthio group that may contain a substituent, and a heterocyclic group that may contain a substituent. At least one or more of R36 to R41 are alkoxy groups.

Because the alkoxy group has an electron donating property, the number of alkoxy groups in General formula X2 is preferably from 1 through 3. When the number of alkoxy groups in General formula X2 is from 1 through 3, it is possible to overcome a problem that the oxidation potential becomes extremely low.

Among these examples, an alkyl group, an alkoxy group, a hydrogen atom, an aryl group, an aryloxy group, and a halogen atom are preferable.

Specific examples of the compounds (alkoxy benzenes) represented by General formula X2 include, but are not limited to, compounds having the structures presented below.

The alkoxy benzenes are not limited to these examples.

[Example compound X2-1]

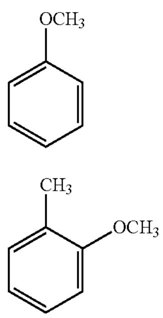

[Example compound X2-2]

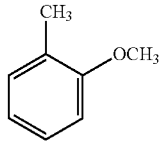

[Example compound X2-3]

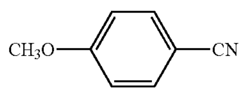

[Example compound X2-4]

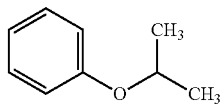

[Example compound X2-5]

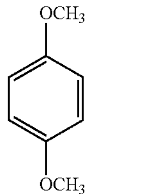

[Example compound X2-6]

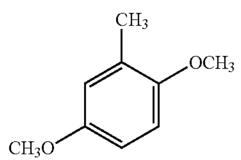

[Example compound X2-7]

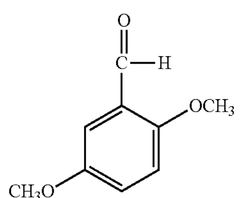

[Example compound X2-8]

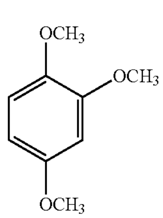

[Example compound X2-9]

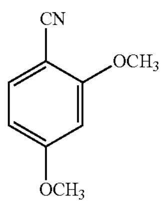

-continued

[Example compound X2-10]

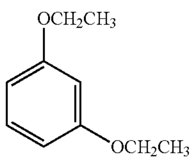

[Example compound X2-11]

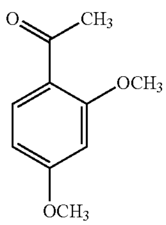

[Example compound X2-12]

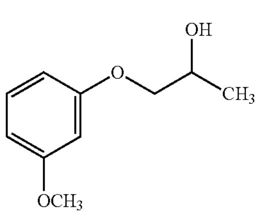

[Example compound X2-13]

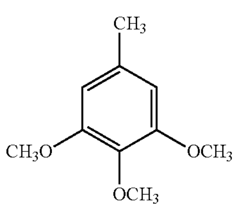

[Example compound X2-14]

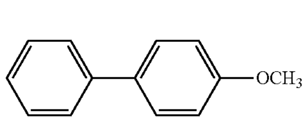

—Cyano Benzenes—

Examples of the cyano benzenes include, but are not limited to, compounds represented by General formula X3 below.

(General formula X3)

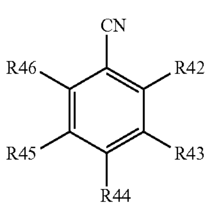

Examples of each of R42 to R46 in General formula X3 include, but are not limited to, a hydrogen atom, a halogen atom, a nitro group, a cyano group, an amide group, a carbonyl group, an alkyl group that may contain a substituent, an aryl group that may contain a substituent, an aryloxy group that may contain a substituent, an alkylthio group that may contain a substituent, an arylthio group that may contain a substituent, an a heterocyclic group that may contain a substituent.

Specific examples of the compounds (cyano benzenes) represented by General formula X3 include, but are not limited to, compounds having the structures presented below.

The cyano benzenes are not limited to these examples.

[Example compound X3-1]

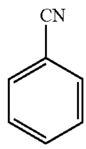

[Example compound X3-2]

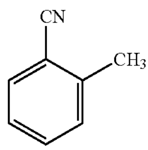

[Example compound X3-3]

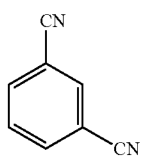

[Example compound X3-4]

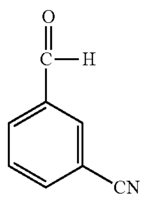

[Example compound X3-5]

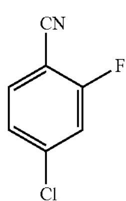

[Example compound X3-6]

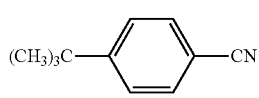

[Example compound X3-7]

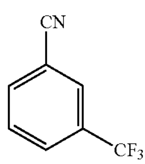

[Example compound X3-8]

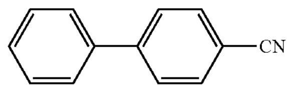

[Example compound X3-9]

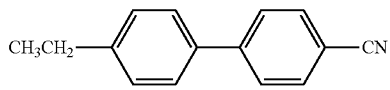

-continued

[Example compound X3-10]

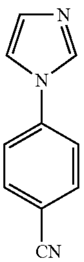

—Phosphates—

Examples of the phosphates include, but are not limited to, compounds represented by General formula X4 below.

(General formula X4)

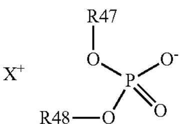

Examples of each of R47 and R48 in General formula X4 include, but are not limited to, an alkyl group that may contain a substituent, an aryl group that may contain a substituent, an aryloxy group that may contain a substituent, and a heterocyclic group that may contain a substituent.

X in General formula X4 represents a cation that forms a pair with the anion site, and is not particularly limited so long as X is a substance that does not inhibit an electrochemical reaction of the electrochromic compound and electrochemical reactions of the oxidizable substance and the reducible substance.

Examples of X in General formula X4 include, but are not limited to, alkali metal ions such as lithium, potassium, and sodium; imidazole derivatives such as N,N-dimethyl imidazole, N,N-methyl ethyl imidazole, and N,N-methyl propyl imidazole; pyridinium derivatives such as N,N-dimethyl pyridinium and N,N-methyl propyl pyridinium; and aliphatic quaternary ammonium such as trimethyl propyl ammonium, triethyl hexyl ammonium, and tetraethyl ammonium. X is chemically bonded via R47 or R48, and may be a zwitterion.

Specific examples of the compound (phosphates) represented by General formula X4 include, but are not limited to, compounds having the structures presented below.

The phosphates are not limited to these examples.

[Example compound X4-1]

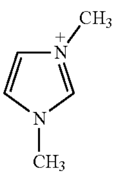

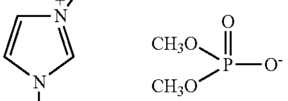

[Example compound X4-2]

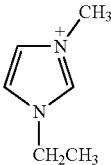

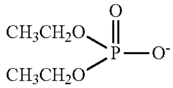

-continued

[Example compound X4-3]

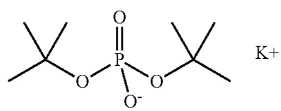

[Example compound X4-4]

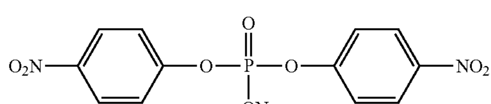

[Example compound X4-5]

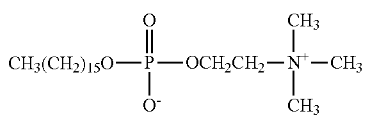

—Phosphites—

Examples of the phosphites include, but are not limited to, compounds represented by General formula X5 below.

(General formula X5)

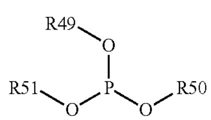

Examples of each of R49 to R51 in General formula X5 include, but are not limited to, a hydrogen atom, a halogen atom, a nitro group, a cyano group, an amide group, a carbonyl group, an alkyl group that may contain a substituent, an aryl group that may contain a substituent, an alkoxy group that may contain a substituent, an aryloxy group that may contain a substituent, an alkylthio group that may contain a substituent, an arylthio group that may contain a substituent, and a heterocyclic group that may contain a substituent.

Specific examples of the compounds (phosphites) represented by General formula X5 include, but are not limited to, compounds having the structures presented below.

The phosphites are not limited to these examples.

[Example compound X5-1]

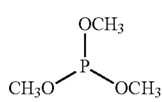

[Example compound X5-2]

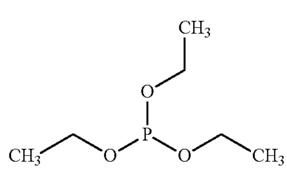

[Example compound X5-3]

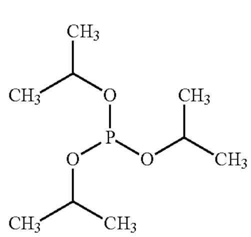

-continued

[Example compound X5-4]

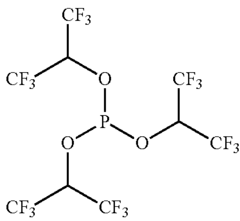

[Example compound X5-5]

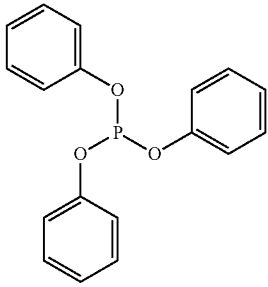

[Example compound X5-6]

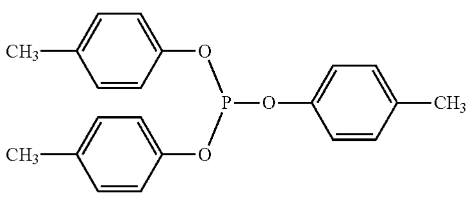

[Example compound X5-7]

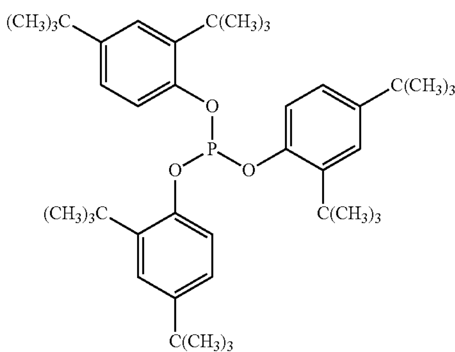

[Example compound X5-8]

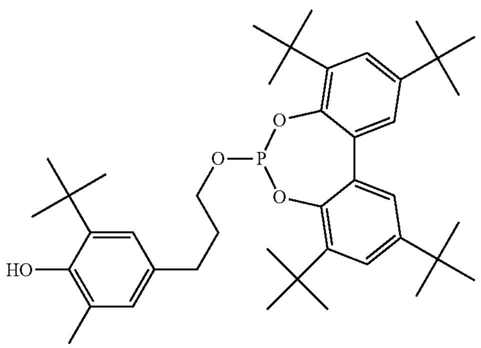

-Annulenes—

Examples of the annulenes include, but are not limited to, compounds represented by General formula X6 below.

(General formula X6)

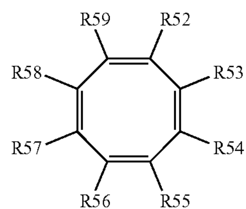

Examples of each of R52 to R59 in General formula X6 include, but are not limited to, a hydrogen atom, a halogen atom, a nitro group, a cyano group, an amide group, a carbonyl group, an alkyl group that may contain a substituent, an aryl group that may contain a substituent, an alkoxy group that may contain a substituent, an aryloxy group that may contain a substituent, an alkylthio group that may contain a substituent, an arylthio group that may contain a substituent, and a heterocyclic group that may contain a substituent.

Specific examples of the compounds (annulenes) represented by General formula X6 include, but are not limited to, compounds having the structures presented below.

The annulenes are not limited to these examples.

[Example compound X6-1]

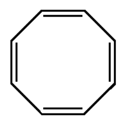

[Example compound X6-2]

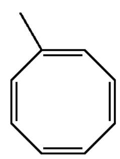

[Example compound X6-3]

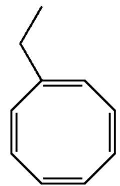

[Example compound X6-4]

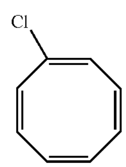

[Example compound X6-5]

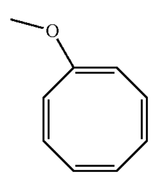

-continued

[Example compound X6-6]

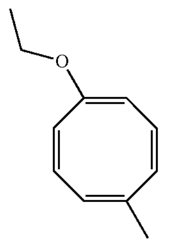

[Example compound X6-7]

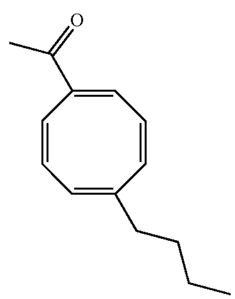

It is preferable that the oxidizable substance be colorless and transparent. If the oxidizable substance is not colorless and transparent, the color of the oxidizable substance appears even when the electrochromic element is in a non-color changed state, and the electrochromic element may not be able to realize the intended, desired color state.

—Reducible Substance—

The reducible substance is a substance that exhibits an electrochemical reduction reaction.

The reducible substance contains a reducible group, which is a functional group that exhibits the electrochemical reduction reaction of the reducible substance.

It is preferable that the reduction potential of the reducible substance be baser than the reduction potential of the reducible electrochromic compound. It is preferable that the reducible substance not undergo an oxidation-reduction reaction in normal color development and decolorization drives in which color remaining is absent. With the reduction potential of the reducible substance baser than the reduction potential of the reducible electrochromic compound, it is possible to suppress the amount by which the reducible substance undergoes a reduction reaction to a low amount when a potential at which the reducible electrochromic compound undergoes a reduction reaction is applied across the electrodes.

When the reduction potential of the reducible substance is nobler than the reduction potential of the reducible electrochromic compound, not only does the reducible substance undergo a reduction reaction by normal color development and decolorization drives to degrade the efficiency, but also the reducible group robs the reduced body of the reducible electrochromic compound of electrons, to make it impossible for the electrochromic element to maintain a color changed state, leading to degradation of the memory performance.

When the reduction potential of the reducible group is baser than the reduction potential of the reducible electrochromic compound, the electrochromic element in a color changed state can maintain the color changed state and can return to the initial state at an arbitrary timing by application of a voltage.

The reducible substance that satisfies this condition is different depending on the reduction potential of the reducible electrochromic compound. For example, the reduction potential of viologen-based substances is about from −1.2 V through −0.8 V (vs. ferrocene). Therefore, any functional group that undergoes a reduction reaction at a potential baser than this potential can be used. Specific examples of the reducible substance include, but are not limited to, acid anhydrides, aromatic ketones, and unsaturated fatty acid esters.

It is preferable that the reduction reaction of the reducible group be irreversible. "Irreversible" means that the reduced body obtained through a reduction reaction of the reducible group is not easily oxidized and returned to the original reducible group.

If the reduction reaction of the reducible group is reversible, the reduced body of the reducible group undergoes an oxidation reaction when returning to the original reducible group. Therefore, in a complementary electrochromic element like the element according to the first embodiment of the present disclosure, the amount by which the oxidizable electrochromic compound undergoes an oxidation reaction decreases by the amount of that oxidation reaction. This gives rise to a problem that the tone of the electrochromic element becomes different from what it has been. When the reduction reaction of the reducible group is irreversible, the problem described above does not occur, and the tone of the color changed state of the electrochromic element remains the same.

Examples of the reducible substance that exhibits the irreversible reduction reaction include, but are not limited to, acid anhydrides, aromatic ketones, and unsaturated fatty acid esters.

—Acid Anhydrides—

Examples of the acid anhydrides include, but are not limited to, compounds represented by General formula X7 below.

(General formula X7)

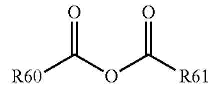

Examples of each of R60 and R61 in General formula X7 include, but are not limited to, a hydrogen atom, a halogen atom, a nitro group, a cyano group, an amide group, a carbonyl group, an alkyl group that may contain a substituent, an aryl group that may contain a substituent, an alkoxy group that may contain a substituent, an aryloxy group that may contain a substituent, an alkylthio group that may contain a substituent, an arylthio group that may contain a substituent, and a heterocyclic group that may contain a substituent. R60 and R61 in General formula X7 may be linked via an organic group.

Specific examples of the compounds (acid anhydrides) represented by General formula X7 include, but are not limited to, compounds having the structures presented below.

The acid anhydrides are not limited to these examples.

[Example compound X7-1]

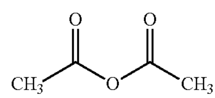

-continued

[Example compound X7-2]

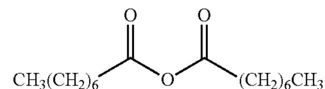

[Example compound X7-3]

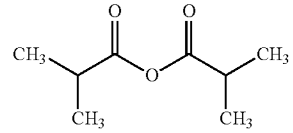

[Example compound X7-4]

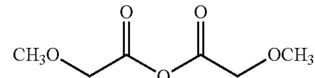

[Example compound X7-5]

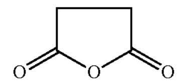

[Example compound X7-6]

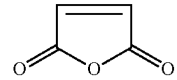

[Example compound X7-7]

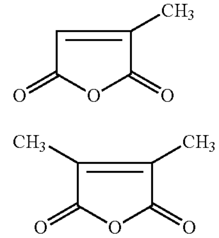

[Example compound X7-8]

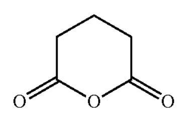

[Example compound X7-9]

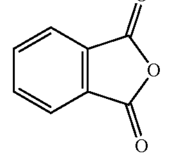

[Example compound X7-10]

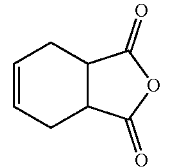

[Example compound X7-11]

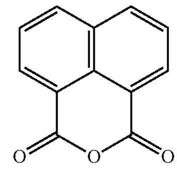

[Example compound X7-12]

—Aromatic Ketones—

Examples of the aromatic ketones include, but are not limited to, compounds represented by General formula X8 below.

(General formula X8)

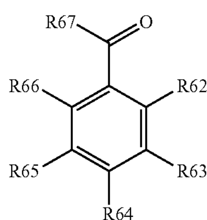

Examples of each of R62 to R67 in General formula X8 include, but are not limited to, a hydrogen atom, a halogen atom, a nitro group, an amide group, a carbonyl group, an ester group, an alkyl group that may contain a substituent, an aryl group that may contain a substituent, an alkoxy group that may contain a substituent, an aryloxy group that may contain a substituent, an alkylthio group that may contain a substituent, an arylthio group that may contain a substituent, and a heterocyclic group that may contain a substituent.

Specific examples of the compounds (aromatic ketones) represented by General formula X8 include, but are not limited to, compounds having the structures presented below.

The aromatic ketones are not limited to these examples.

[Example compound X8-1]

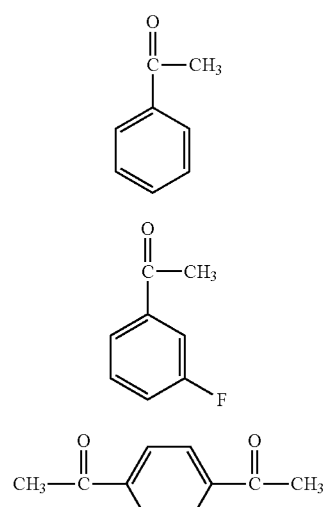

[Example compound X8-2]

[Example compound X8-3]

[Example compound X8-4]

[Example compound X8-5]

[Example compound X8-6]

-continued

[Example compound X8-7]

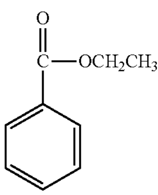

[Example compound X8-8]

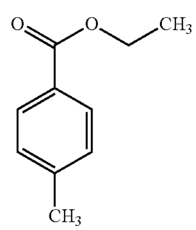

[Example compound X8-9]

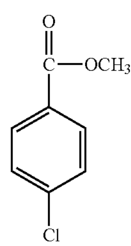

—Unsaturated Fatty Acid Esters—

Examples of the unsaturated fatty acid esters include, but are not limited to, compounds represented by General formula X9 below.

(General formula X9)

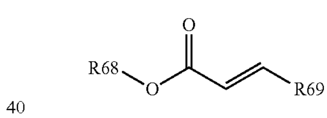

Examples of each of R68 and R69 in General formula X9 include, but are not limited to, a hydrogen atom, a halogen atom, a nitro group, a cyano group, an amide group, a carbonyl group, an alkyl group that may contain a substituent, an alkenyl group that may contain a substituent an alkoxy group that may contain a substituent, an alkylthio group that may contain a substituent, and a heterocyclic group that may contain a substituent.

Specific examples of the compounds (unsaturated fatty acid esters) represented by General formula X9 include, but are not limited to, compounds having the structures presented below.

The unsaturated fatty acid esters are not limited to these examples.

[Example compound X9-1]

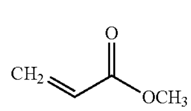

[Example compound X9-2]

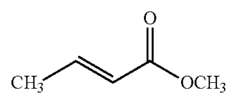

-continued

[Example compound X9-3]

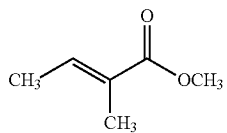

[Example compound X9-4]

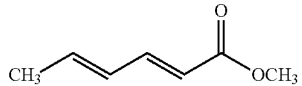

[Example compound X9-5]

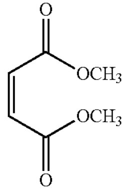

[Example compound X9-6]

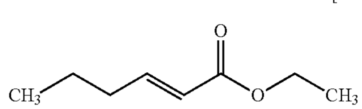

[Example compound X9-7]

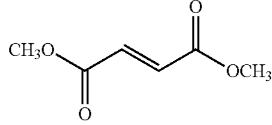

It is preferable that the reducible substance be colorless and transparent. If the reducible substance is not colorless and transparent, the color of the reducible substance appears even when the electrochromic element is in a non-color changed state, and the electrochromic element may not be able to realize the intended, desired color state.

The oxidizable substance and the reducible substance may be the substance via a chemical bond.

—Other Components—

The other components are not particularly limited and may be appropriately selected depending on the intended purpose so long as the other components are components that are used in typical electrochromic elements. Examples of the other components include an electrolyte.

The electrolyte is not particularly limited and may be appropriately selected depending on the intended purpose. As the electrolyte, for example, inorganic ion salts such as alkali metal salts and alkali earth metal salts, quaternary ammonium salts, and acid and alkali supporting electrolytes can be used. Specific examples of the electrolyte include, but are not limited to, $LiClOP_4$, $LiBF_4$, $LiAsF_6$, $LiPF_6$, $LiCF_3SO_3$, $LiCF_3COO$, KCl, $NaClO_3$, NaCl, $NaBF_4$, NaSCN, $KBF_4$, $Mg(ClO_4)_2$, and $Mg(BF_4)_2$.

As the electrolyte, an ionic liquid formed of an arbitrary combination of a cationic component and an anionic component may be used. The ionic liquid is preferable because the ionic liquid has a molecular structure that is liquid in a wide temperature range including room temperature.

The cationic component is not particularly limited and may be appropriately selected depending on the intended purpose. Examples of the cationic component include, but are not limited to, imidazole derivatives such as N,N-dimethyl imidazole salt, N,N-methylethyl imidazole salt, and N,N-methylpropyl imidazole salt; pyridinium derivatives such as N,N-dimethyl pyridinium salt and N,N-methyl propylpyridinium salt; and aliphatic quaternary ammonium-based compounds such as trimethylpropyl ammonium salt, trimethylhexyl ammonium salt, and triethylhexyl ammonium salt.

The anionic component is not particularly limited and may be appropriately selected depending on the intended purpose. As the anionic component, it is preferable to use a compound containing fluorine, considering stability in the air. Specific examples of the anionic component include, but are not limited to, $BF_4^-$, $CF_3SO_3^-$, $PF_4^-$, and $(CF_3SO_2)_2N^-$.

The electrolyte may be directly dissolved in any of photopolymerizable monomers, oligomers, and liquid crystal materials. When solubility is poor, the electrolyte may be dissolved in a trace solvent, and the obtained solution may be used as a mixture with any of photopolymerizable monomers, oligomers, and liquid crystal materials.

The solvent is not particularly limited and may be appropriately selected depending on the intended purpose. Examples of the solvent include, but are not limited to, propylene carbonate, acetonitrile, γ-butyrolactone, ethylene carbonate, sulfolane, dioxolane, tetrahydrofuran, 2-methyl tetrahydrofuran, dimethyl sulfoxide, 1,2-dimethoxyethane, 1,2-ethoxymethoxyethane, polyethylene glycol, and alcohols, or mixture solvents of these solvents.

The electrolyte layer containing the electrolyte needs not be a low-viscosity liquid, but may take various forms such as a gel state, a polymeric cross-linked state, and a liquid crystal dispersion state. When the electrolyte layer is formed in a gel state or a solid state, advantages such as an improved element strength and an improved reliability can be obtained.

As the method for forming the electrolyte in a solid state, it is preferable to hold an electrolyte in a polymer resin. This is preferable because a high ion conductivity and a high solid strength can be obtained.

As the polymer resin, a photo-curable resin is preferable because the element can be produced at a lower temperature and within a shorter time than when it is produced by thermal polymerization or by a method of forming a thin film by evaporating a solvent.

The average thickness of the electrolyte layer is not particularly limited, may be appropriately selected depending on the intended purpose, and is preferably 100 nm or greater but 100 micrometers or less.

<Electrochromic Layers>

The first embodiment includes an oxidizable electrochromic layer and a reducible electrochromic layer.

The second embodiment includes an oxidizable electrochromic layer.

The third embodiment includes a reducible electrochromic layer.

—Oxidizable Electrochromic Layer—

The oxidizable electrochromic layer is present between the first electrode and the electrolyte layer and may be laminated over the first electrode. The oxidizable electrochromic layer may have a single layer structure including only one layer or a multilayer structure including two or more layers.

The oxidizable electrochromic layer contains an oxidizable electrochromic compound.

The oxidizable electrochromic compound is a compound that, through an electrochemical oxidation reaction, changes light absorption of the electrochromic element in the target light wavelength range, from light absorption of the electrochromic element in the initial state.

The oxidizable electrochromic compound is not particularly limited and may be appropriately selected depending on the intended purpose so long as the oxidizable electrochromic compound can be maintained as a layer over the electrode. The oxidizable electrochromic compound may be an inorganic compound or an organic compound.

The inorganic compound is not particularly limited and may be appropriately selected depending on the intended purpose. Examples of the inorganic compound include, but are not limited to, iridium oxide, nickel oxide, rhodium oxide, and chromium oxide.

One of these inorganic compounds may be used alone or two or more of these inorganic compounds may be used in combination.

The organic compound is not particularly limited and may be appropriately selected depending on the intended purpose. Examples of the organic compound include, but are not limited to, amines containing an aromatic ring (e.g., fenadine derivatives and triarylamine derivatives), thiophene derivatives, pyrrole derivatives, thiazine derivatives, triallylmethane derivatives, bisphenylmethane derivatives, xanthene derivatives, fluoran derivatives, and spiropyran derivatives. Among these organic compounds, triarylamine derivatives are preferable in terms of a high durability through driving, light resistance, color selectivity, and contrast.

One of these organic compounds may be used alone or two or more of these organic compounds may be used in combination.

Examples of the triarylamine derivatives include, but are not limited to a compound represented by General formula 1 below.

$$A_n\text{-}B_m \qquad \text{[General formula 1]}$$

In General formula 1, m is 0 when n=2, and m is 0 or 1 when n=1.

In General formula 1, A is the structure represented by General formula 2 below, and binds with B at any of the positions $R_1$ to $R_{15}$.

In General formula 1, B is the structure represented by General formula 3 below, and binds with A at any of the positions $R_{16}$ to $R_{21}$.

[General formula 2]

[General formula 3]

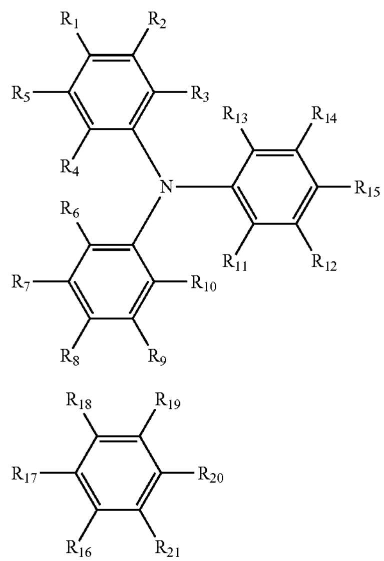

It is preferable that any of $R_1$ to $R_{21}$ in General formula 2 and General formula 3 be chemically bound in the electrochromic layer via a polymerizable functional group or a functional group that can directly or indirectly bind with a hydroxyl group. This makes it possible for the oxidizable electrochromic compound to be carried in the electrochromic layer. The rest of $R_1$ to $R_{21}$ are all monovalent organic group that may be the same or different.

The polymerizable functional group is not particularly limited and may be appropriately selected depending on the intended purpose so long as the polymerizable functional group is a group that contains a carbon-carbon double bond and has polymerizability. Examples of the polymerizable functional group include, but are not limited to, a vinyl group, a styryl group, a 2-methyl-1,3-butadienyl group, a vinyl carbonyl group, an acryloyloxy group, an acryloylamide group, and a vinylthioether group.

The functional group that can directly or indirectly bind with a hydroxyl group is not particularly limited and may be appropriately selected depending on the intended purpose so long as it is a functional group that can directly or indirectly bind with a hydroxyl group through hydrogen bonding, adsorption, or a chemical reaction. Specific examples of the structure of the functional group that can directly or indirectly bind with a hydroxyl group include, but are not limited to, a phosphonic acid group, a phosphoric acid group, silyl groups (or silanol groups) such as a trichlorosilyl group, a trialkoxysilyl group, a monochlorosilyl group, and a monoalkoxysilyl group, and a carboxyl group.

Examples of the trialkoxysilyl group include, but are not limited to, a triethoxysilyl group and a trimethoxysilyl group.

Among these functional groups, a phosphonic acid group and silyl groups (a trialkoxysilyl group or a trihydroxysilyl group) that have a high bindability with a conductive or a semiconductor nanostructure are preferable.

The monovalent organic group is not particularly limited and may be appropriately selected depending on the intended purpose. Examples of each independent monovalent organic group include, but are not limited to, a hydrogen atom, a halogen atom, a hydroxyl group, a nitro group, a cyano group, a carboxyl group, an alkoxycarbonyl group that may contain a substituent, an aryloxycarbonyl group that may contain a substituent, an alkylcarbonyl group that may contain a substituent, an arylcarbonyl group that may contain a substituent, an amide group, a monoalkylaminocarbonyl group that may contain a substituent, a dialkylaminocarbonyl group that may contain a substituent, a monoarylaminocarbonyl group that may contain a substituent, a diarylaminocarbonyl group that may contain a substituent, a sulfonic acid group, an alkoxysulfonyl group that may contain a substituent, an aryloxysulfonyl group that may contain a substituent, an alkylsulfonyl group that may contain a substituent, an arylsulfonyl group that may contain a substituent, a sulfonamide group, a monoalkylaminosulfonyl group that may contain a substituent, a dialkylaminosulfonyl group that may contain a substituent, a monoarylaminosulfonyl group that may contain a substituent, a diarylaminosulfonyl group that may contain a substituent, an amino group, a monoalkylamino group that may contain a substituent, a dialkylamino group that may contain a substituent, an alkyl group that may contain a substituent, an alkenyl group that may contain a substituent, an alkynyl group that may contain a substituent, an aryl group that may contain a substituent, an alkoxy group that may contain a substituent, an aryloxy group that may contain a substituent, an alkylthio group that may contain a substituent, an arylthio group that may contain a substituent, and a heterocyclic group that may contain a substituent.

Among these monovalent organic groups, an alkyl group that may contain a substituent, an alkoxy group that may contain a substituent, a hydrogen atom, an aryl group that may contain a substituent, an aryloxy group that may contain a substituent, a halogen atom, an alkenyl group that may contain a substituent, and an alkynyl group that may contain a substituent are preferable in terms of stable operation.

Examples of the halogen atom include, but are not limited to, a fluorine atom, chlorine atom, a bromine atom, and an iodine atom.

Examples of the alkyl group include, but are not limited to, a methyl group, an ethyl group, a propyl group, and a butyl group.

Examples of the aryl group include, but are not limited to, a phenyl group and a naphthyl group.

Examples of the aralkyl group include, but are not limited to, a benzyl group, a phenethyl group, and a naphthylmethyl group.

Examples of the alkoxy group include, but are not limited to, a methoxy group, an ethoxy group, and a propoxy group.

Examples of an aryloxy group include, but are not limited to, a phenoxy group, a 1-naphthyloxygroup, a 2-naphthyloxy group, a 4-methoxyphenoxy group, and a 4-methylphenoxy group.

Examples of the heterocyclic group include, but are not limited to, carbazole, dibenzofuran, dibenzothiophene, oxadiazole, and thiadiazole.

Examples of the substituent that is further substituted for the substituents include, but are not limited to, a halogen atom, alkyl groups such as a nitro group, a cyano group, a methyl group, and an ethyl group, alkoxy groups such as a methoxy group and an ethoxy group, aryloxy groups such as a phenoxy group, aryl groups such as a phenyl group and a naphthyl group, and aralkyl groups such as a benzyl group and a phenethyl group.

Specific examples of the compound (oxidizable electrochromic compound) represented by General formula 1 above include, but are not limited to, compounds having the structures presented below.

The oxidizable electrochromic compound is not limited to these compounds.

[Example compound 1]

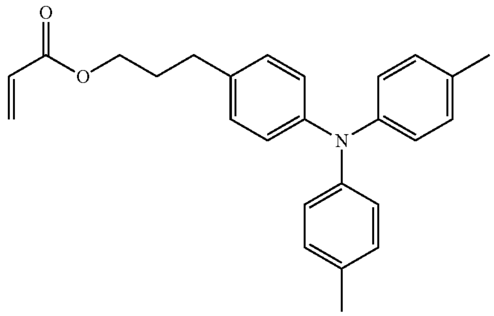

[Example compound 2]

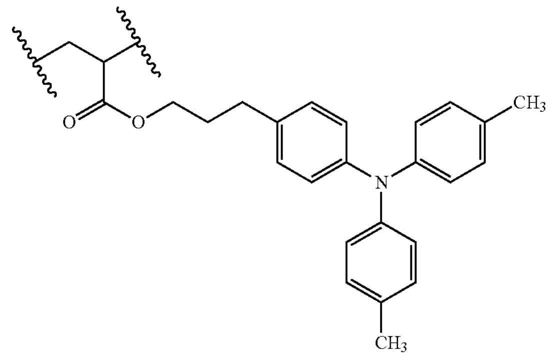

[Example compound 3]

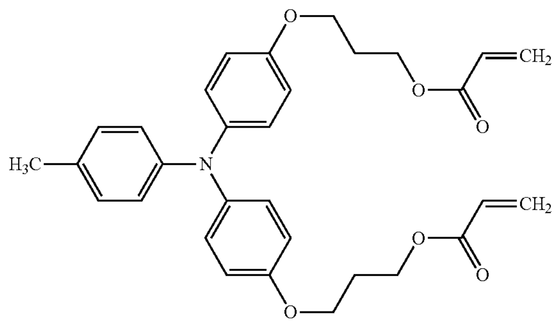

[Example compound 4]

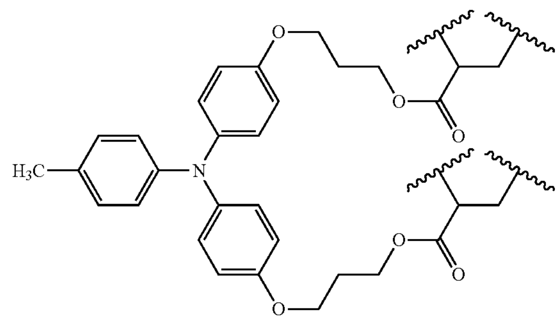

-continued
[Example compound 5]
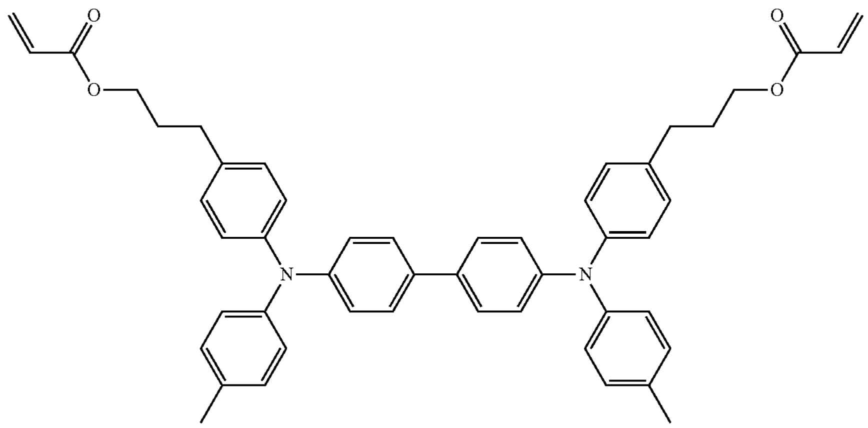
[Example compound 6]
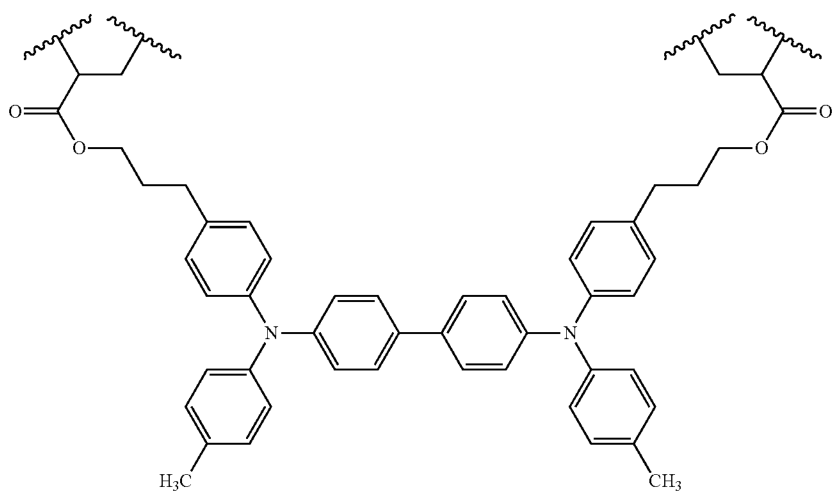
[Example compound 7]
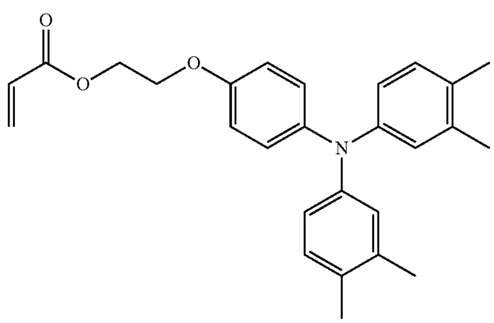
[Example compound 8]
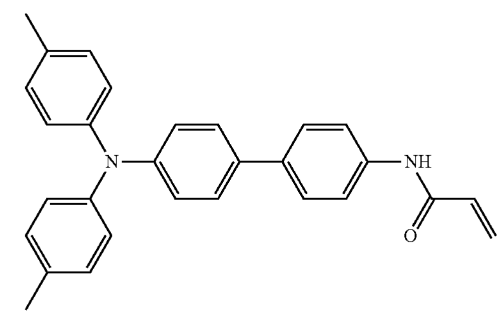
[Example compound 9]
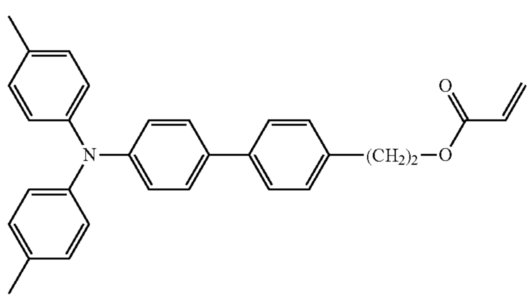
[Example compound 10]
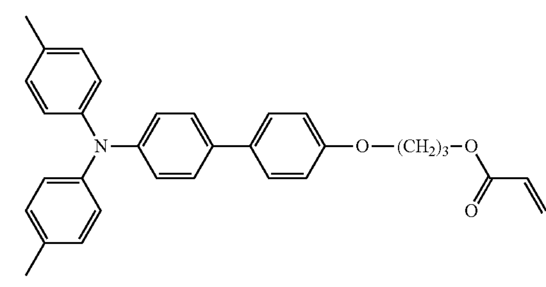

-continued
[Example compound 11]
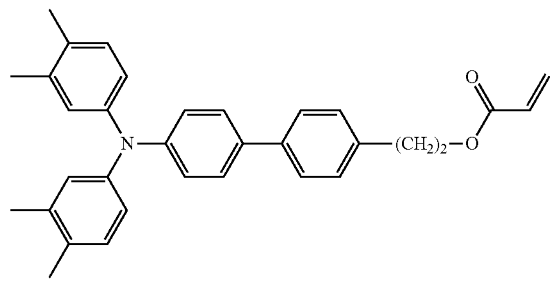
[Example compound 12]
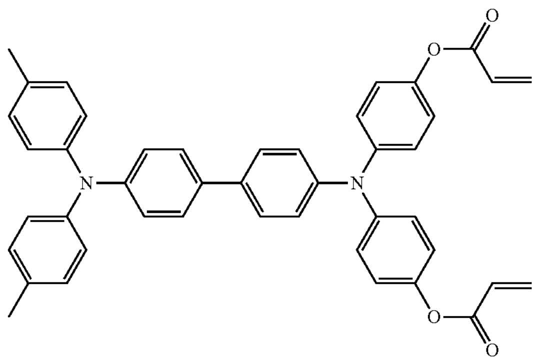
[Example compound 13]
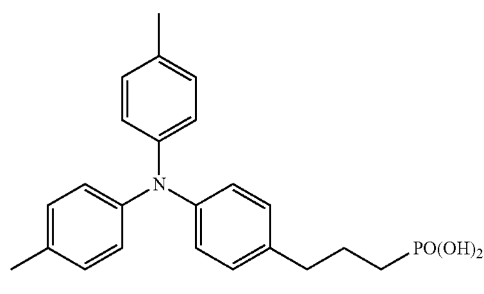
[Example compound 14]
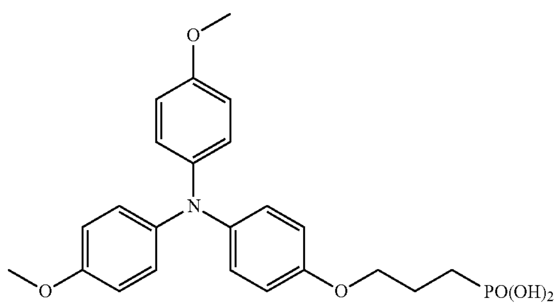
[Example compound 15]
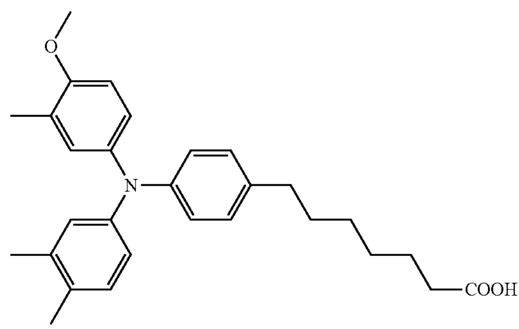
[Example compound 16]
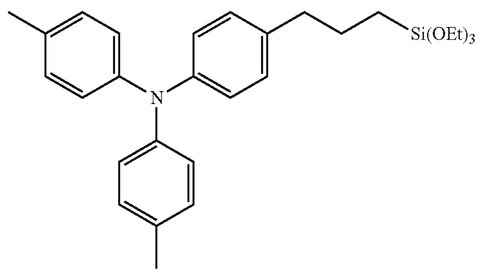
[Example compound 17]
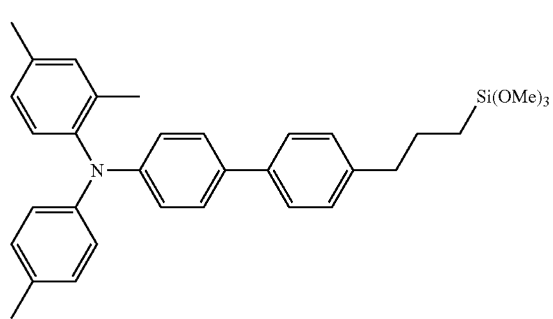

-continued

[Example compound 18]

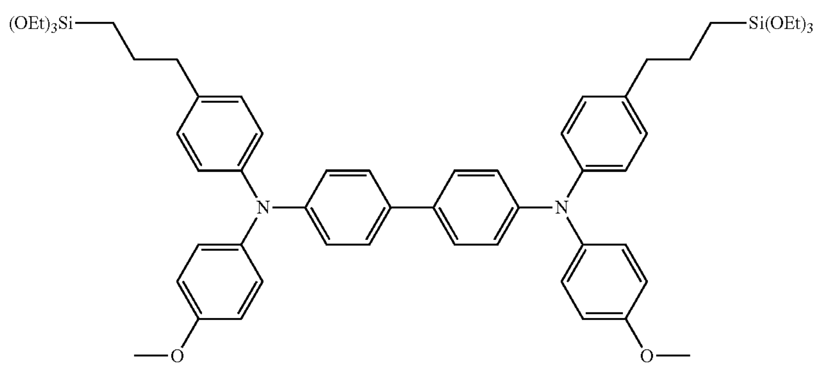

The voltage (threshold voltage) for causing the oxidizable electrochromic compound to develop a color can be determined by measurement of an oxidation potential. The method for measuring an oxidation potential is not particularly limited and may be appropriately selected depending on the intended purpose. For example, an oxidation potential can be measured by cyclic voltammetry.

The method for forming the oxidizable electrochromic layer is not particularly limited and may be appropriately selected depending on the intended purpose.

When the oxidizable electrochromic compound is an inorganic compound, examples of the method include, but are not limited to, a sputtering method, a vapor deposition method, coating of nanoparticles of an oxidizable electrochromic compound, and an electrolytic precipitation method.

When the oxidizable electrochromic compound is an organic compound, examples of the method include, but are not limited to, a method of forming a polymeric film of the oxidizable electrochromic compound, and a method of making conductive or semiconductor particles carry the oxidizable electrochromic compound.

Specific examples of the method of forming a polymeric film of the oxidizable electrochromic compound include, but are not limited to, a method of dissolving a polymerized organic EC compound in a solvent, coating an electrode with the resultant, and removing the solvent, and a method of coating an electrode with an organic EC compound into which a polymerizable functional group is introduced and a polymerization initiator together and polymerizing the resultant.

Examples of the method for coating the electrode include, but are not limited to, a spin coating method, a casting method, a micro gravure coating method, a gravure coating method, a bar coating method, a roll coating method, a wire bar coating method, a dip coating method, a slit coating method, a capillary coating method, a spray coating method, and a nozzle coating method, and various printing methods such as a gravure printing method, a screen printing method, a flexography method, an offset printing method, a reverse printing method, and an inkjet printing method.

The average thickness of the oxidizable electrochromic layer is not particularly limited, may be appropriately selected depending on the intended purpose, and is preferably 0.1 micrometers or greater but 30 micrometers or less and more preferably 0.4 micrometers or greater but 10 micrometers or less. When the average thickness of the oxidizable electrochromic layer is 0.1 micrometers or greater, a high color developing density is likely to be obtained. When the average thickness of the oxidizable electrochromic layer is 30 micrometers or less, the production cost can be saved and coloring is not likely to degrade visibility.

—Reducible Electrochromic Layer—

The reducible electrochromic layer is present between the second electrode and the electrolyte layer, and may be laminated over the second electrode. The reducible electrochromic layer may have a single layer structure including only one layer or a multilayer structure including two or more layers.

The reducible electrochromic layer contains a reducible electrochromic compound.

The reducible electrochromic compound is a compound that, through an electrochemical reduction reaction, changes light absorption of the electrochromic element in the target light wavelength range, from light absorption of the electrochromic element in the initial state.

The reducible electrochromic compound is not particularly limited, may be appropriately selected depending on the intended purpose, and may be an inorganic compound or an organic compound.

The inorganic compound is not particularly limited and may be appropriately selected depending on the intended purpose. Examples of the inorganic compound include, but are not limited to, tungsten oxide, molybdenum oxide, iridium oxide, and titanium oxide.

One of these inorganic compounds may be used alone or two or more of these inorganic compounds may be used in combination.

The organic compound is not particularly limited and may be appropriately selected depending on the intended purpose. Examples of the organic compound include, but are not limited to, anthraquinone-based, viologen-based, thioindigo-based, and terephthalic acid-based organic compounds.

Among these organic compounds, viologen-based compounds are preferable in terms of durability and tone.

One of these organic compounds may be used alone or two or more of these organic compounds may be used in combination.

The method for forming the reducible electrochromic layer may be performed in the same manner as the method for forming the oxidizable electrochromic layer described above.

The average thickness of the reducible electrochromic layer is preferably 0.1 micrometers or greater but 30 micrometers or less and more preferably 0.4 micrometers or greater but 10 micrometers or less. When the average thickness of the reducible electrochromic layer is 0.1 micrometers or greater, a high color developing density is likely to be obtained. When the average thickness of the reducible electrochromic layer is 30 micrometers or less, the production cost can be saved and coloring is not likely to degrade visibility.

<Other Members>

The other members are not particularly limited and may be appropriately selected depending on the intended purpose. Examples of the other members include, but are not limited to, supports (may also be referred to as substrates), an insulating porous layer, an anti-deterioration layer, and a protection layer.

—Supports—

For example, the shape, structure, size, and material of the supports are not particularly limited and may be appropriately selected depending on the intended purpose so long as the supports are formed of a transparent material that can support the respective layers and have a structure that can support the respective layers.

The shape of the supports is not particularly limited and may be appropriately selected depending on the intended purpose. Examples of the shape of the supports include, but are not limited to, a flat plate shape, and a shape having a curved surface.

The material of the supports may be any material that is transparent, and known organic materials and inorganic materials can be used as they are. Examples of the known organic materials and inorganic materials include, but are not limited to, glass substrates such as alkali-free glass, borosilicate glass, float glass, and soda-lime glass, and resin substrates such as polycarbonate resins, acrylic resins, polyethylene, polyvinyl chloride, polyester, epoxy resins, melamine resins, phenol resins, polyurethane resins, and polyimide resins.

A transparent insulating layer, a UV blocking layer, and an antireflection layer may be provided over the surfaces of the supports in order to improve a water vapor barrier property, a gas barrier property, ultraviolet resistance, and visibility.

—Insulating Porous Layer—

The insulating porous layer has a function of spacing the first electrode layer and the second electrode layer apart from each other in order to electrically insulate the first electrode layer and the second electrode layer from each other, and a function of holding an electrolyte. The material of the insulating porous layer is not particularly limited and may be appropriately selected depending on the intended purpose so long as the material is porous. It is preferable to use an organic material or an inorganic material having a high insulating property, a high durability, and an excellent film forming property, and a combined material of an organic material and an inorganic material.

The method for forming the insulating porous layer is not particularly limited and may be appropriately selected depending on the intended purpose. Examples of the method include, but are not limited to, a sintering method (which fuses polymeric particles or inorganic particles partially with each other with addition of, for example, a binder, and utilizes the pores produced between the particles), an extraction method (which forms a constituent layer using an organic substance or an inorganic substance that is soluble in a solvent and, for example, a binder that is insoluble in a solvent, and then dissolves the organic substance or the inorganic substance in a solvent to obtain pores), a foaming method, a phase inversion method of phase-separating a mixture of polymers by operation of a good solvent and a poor solvent, and a radioactive irradiation method of radiate various kinds of radioactive rays to form pores.

—Anti-Deterioration Layer—

The anti-deterioration layer has a function of undergoing a reverse chemical reaction from that of the electrochromic layer to balance charges and suppress corrosion and deterioration of the first electrode layer and the second electrode layer due to irreversible oxidation-reduction reactions of the first electrode layer and the second electrode layer. The reverse reaction includes oxidation-reduction of the anti-deterioration layer and the anti-deterioration layer's functioning as a capacitor.

The material of the anti-deterioration layer is not particularly limited and may be appropriately selected depending on the intended purpose so long as the material is a material that has a function of preventing corrosion of the first electrode layer and the second electrode layer due to irreversible oxidation-reduction reactions of the first electrode layer and the second electrode layer. Examples of the material of the anti-deterioration layer include, but are not limited to, antimony tin oxide, nickel oxide, titanium oxide, zinc oxide, and tin oxide, or conductive or semiconductor metal oxides containing a plurality of these materials.

The anti-deterioration layer may be formed of a porous thin film that does not inhibit injection of an electrolyte. It is possible to obtain a suitable porous thin film that can be permeated by an electrolyte and also serves the function as the anti-deterioration layer, by immobilizing conductive or semiconductor metal oxide particles formed of, for example, antimony tin oxide, nickel oxide, titanium oxide, zinc oxide, and tin oxide to the second electrode using, for example, an acrylic-based, an alkyd-based, an isocyanate-based, a urethane-based, an epoxy-based, or a phenol-based binder.

—Protection Layer—

Examples of the functions of the protection layer include, but are not limited to, protecting the element from external stress or chemicals of a washing step, preventing leak of an electrolyte, and preventing intrusion of matters that are unnecessary for a stable operation of the electrochromic element such as moisture and oxygen in the air.

The average thickness of the protection layer is not particularly limited, may be appropriately selected depending on the intended purpose, and is preferably from 1 micrometer through 200 micrometers.

The material of the protection layer is not particularly limited and may be appropriately selected depending on the intended purpose. For example, ultraviolet-curable or thermosetting resins can be used as the material of the protection layer.

Specific examples of the material of the protection layer include, but are not limited to, acrylic-based resins, urethane-based resins, and epoxy-based resins.

(Method for Driving Electrochromic Element)

A method for driving an electrochromic element of the present disclosure can be suitably performed using the electrochromic element of the present disclosure.

The method for driving an electrochromic element of the present disclosure includes a step of applying to the electrochromic element, a voltage higher than a threshold voltage Vc needed for the electrochromic element to change from an initial state to a color changed state, and a step of applying to the electrochromic element, a voltage of an opposite polarity to the threshold voltage Vc, and further includes other steps as needed.

The driving method includes a step (step P1) of applying to the electrochromic element, a voltage higher than a threshold voltage Vc needed for the electrochromic element to change from an initial state to a color changed state, and a step (step P2) of applying to the electrochromic element, a voltage of an opposite polarity to the threshold voltage Vc.

The step P1 applies a voltage higher than a threshold voltage Vc across the two electrodes of the electrochromic element. This induces an oxidation reaction in which the oxidizable electrochromic compound exhibits electrochromism, and the element obtains a color changed state from an initial state.

The step P2 applies a voltage Vb of an opposite polarity to the threshold Vc. Application of a voltage Vb of an opposite polarity can promote an oxidation reaction of the oxidizable substance and can realize quick return to the initial state. In the step P2, the oxidizable electrochromic compound, which is an oxidized body, undergoes a reduction reaction, and the oxidizable substance takes charge of part of an oxidation reaction, which is a pair reaction with the reduction reaction. As a result, the electrochromic element returns from the color changed state to the initial state.

The oxidation-reduction reaction in the step P2 proceeds by the amount by which the oxidized body of the oxidizable electrochromic compound remains. That is, there is no need for sensing whether any oxidized body of the oxidizable electrochromic compound is present, and it is possible to return the electrochromic element to the initial state only by continuing applying a voltage for returning the electrochromic element to the initial state.

The threshold voltage Vc is the difference between the potential at which the substance at the reduction-side electrode undergoes a reduction reaction and the potential at which the substance at the oxidation-side electrode undergoes an oxidation reaction in the electrochromic element.

In the electrochromic element (complementary EC element) according to the first embodiment, the threshold voltage Vc is a value that is lower by about 0.1 V than the difference between the oxidation-reduction potentials of the oxidizable electrochromic compound and the reducible electrochromic compound. This is because the threshold voltage Vc should be a value that is lower than the difference by about 0.05V because oxidation-reduction reactions occur at potentials lower than oxidation-reduction potentials. Therefore, the threshold voltage Vc is a value that is lower than the difference by 0.1V, which results from addition of the differences of the potentials at which the oxidation-reduction reactions of both of the oxidizable electrochromic compound and the reducible electrochromic compound occur, from the oxidation-reduction potentials.

The threshold voltage V is also different depending on the material of the anti-deterioration layer.

For example, when titanium oxide is used for the anti-deterioration layer in the electrochromic element (oxidation-type EC element) according to the second embodiment, a reduction reaction of the titanium oxide occurs at about −0.7 V. Therefore, when an oxidizable electrochromic compound having an oxidation-reduction potential of 0.38 V is used, the threshold voltage Vc is about 1.0 V, which results from addition with the oxidation-reduction potential of the oxidizable electrochromic compound.

For example, when an ATO film is used for the anti-deterioration layer in the electrochromic element (reduction-type EC element) according to the third embodiment, although the ATO film does not undergo an oxidation-reduction reaction, a capacitive current characteristic is obtained (quantity of charge=capacitance×voltage). In such an electrochromic element, application of a high voltage is needed in order for a sufficient quantity of charge to be obtained at the ATO side. Therefore, the voltage to be applied in the step P1 is a voltage that is much higher than the threshold voltage Vc.

The step P1 and the step P2 can be performed by application of a voltage waveform across both the electrodes using a potentiostat.

EXAMPLES

The present disclosure will be described below by way of Examples. The present disclosure should not be construed as being limited to these Examples.

<Electrochemical Measurement>

The compounds described below were subjected to electrochemical measurement. For measurement of the oxidation-reduction potentials of the oxidizable electrochromic compound and the reducible electrochromic compound, measurement solutions obtained by dissolving these compounds in electrolytic solutions were used.

As the electrolytic solutions, solutions obtained by dissolving tetra-n-butylammonium perchlorate (obtained from Tokyo Chemical Industry Co., Ltd.) in benzonitrile (obtained from Tokyo Chemical Industry Co., Ltd.) in a manner that tetra-n-butyl ammonium perchlorate would be 100 mM were used. To the electrolytic solutions, a triarylamine derivative compound A, which was an oxidizable electrochromic compound, and a viologen-based compound B, which was a reducible electrochromic compound, were dissolved respectively in a manner that each compound would be 5 mM, to prepare measurement solutions for electrochemical measurement. The structures of the compound A and the compound B are presented below.

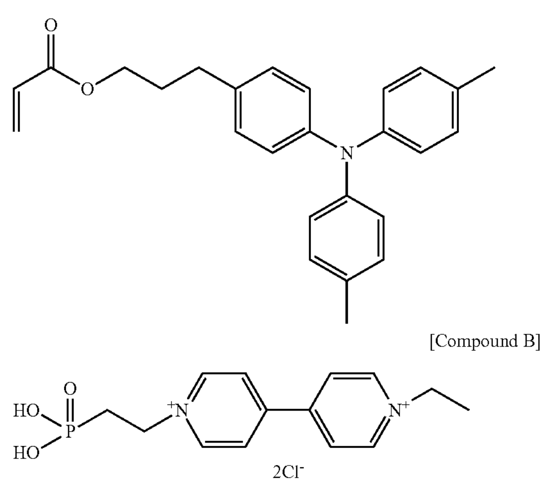

As the cell for performing electrochemical measurement, a platinum disk electrode was used as a working electrode, a platinum needle was used as an antipode, and an Ag/Ag+ electrode was used as a reference electrode. Electrochemical measurement was performed using a potentiogalvanostat (ALS660C, obtained from BAS Inc.) and using a cyclic voltammetry (CV) method as the measuring method. The results are presented in Table 1.

The oxidation potential of the compound A was 0.38 V, and the reduction potential of the compound B was −0.84 V.

Successively, the oxidation-reduction potentials of oxidizable substances and reducible substances and whether oxidation-reduction reactions were irreversible reactions were examined. The same electrolytic solutions as in the measurement of the electrochromic compounds were used as electrolytic solutions, and compounds 1 to 30 presented below, which were used as oxidizable substances and reducible substances, were dissolved in the electrolytic solutions in a manner that each substance would be 5 mM, to prepare measurement solutions.

[Compound 1]

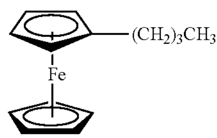

Butylferrocene (obtained from Tokyo Chemical Industry Co., Ltd.)

[Compound 2]

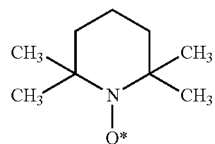

2,2,6,6-Tetramethylpiperidine 1-Oxyl Free Radical (obtained from Tokyo Chemical Industry Co., Ltd.)

[Compound 3]

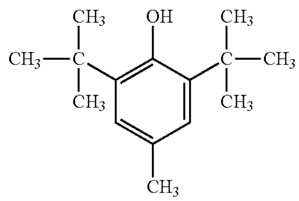

2,6-di-tert-butyl-4-methylphenol (obtained from Tokyo Chemical Industry Co., Ltd.)

[Compound 4]

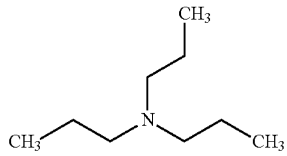

Tripropylamine (obtained from Tokyo Chemical Industry Co., Ltd.

[Compound 5]

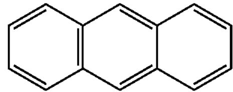

Anthracene (obtained from Tokyo Chemical Industry Co., Ltd.)

[Compound 6]

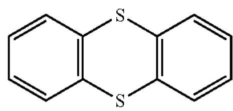

Thianthrene (obtained from Tokyo Chemical Industry Co., Ltd.)

-continued

[Compound 7]

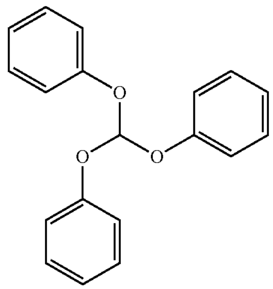

Triphenyl Phosphite (obtained from Tokyo Chemical Industry Co., Ltd.)

[Compound 8]

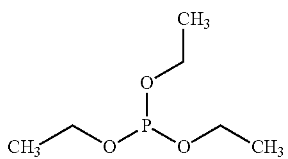

Triethyl Phosphite (obtained from Tokyo Chemical Industry Co., Ltd.)

[Compound 9]

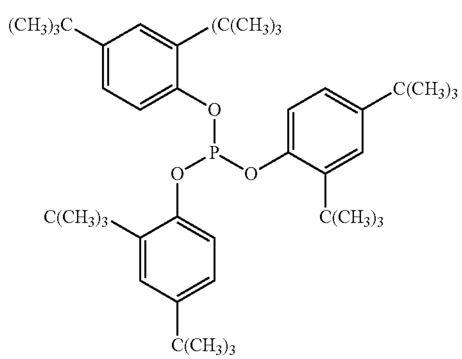

Tris(2,4-di-tert-butylphenyl)phosphite: product name: SONGNOX1680 (obtained from Sumitomo Chemical Industry Company Limited)

[Compound 10]

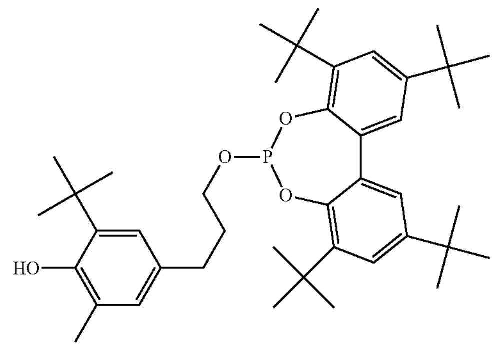

6-[3-(3-tert-Butyl-4-hydroxy-5-methylphenyl)propoxy]-2,4,8,10-tetra-tert-butyldibenzo[d,f][1,3,2]dioxaphosphepin: product name: SUMILIZER GP (obtained from Sumitomo Chemical Industry Company Limited)

-continued

[Compound 11]

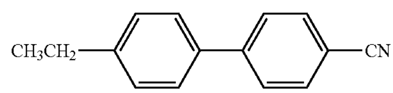

4-Ethyl-4-biphenylcarbonitrile (obtained from Tokyo Chemical Industry Co., Ltd.)

[Compound 12]

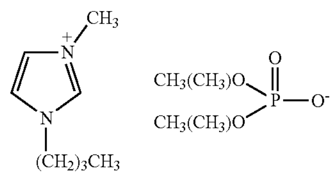

1-Butyl-3-methylimidazolium Dibutyl Phosphate (obtained from Tokyo Chemical Industry Co., Ltd.)

[Compound 13]

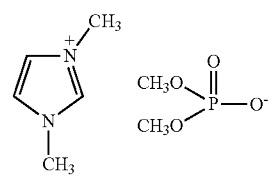

1,3-Dimethylimidazolium Dimethyl Phosphate (obtained from Tokyo Chemical Industry Co., Ltd.)

[Compound 14]

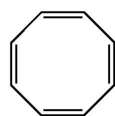

1,3,5,7-Cyclooctatetraine (obtained from Tokyo Chemical Industry Co., Ltd.)

[Compound 15]

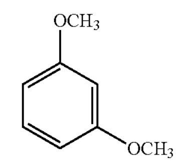

1,3-Dimethoxybenzene (obtained from Tokyo Chemical Industry Co., Ltd.)

[Compound 16]

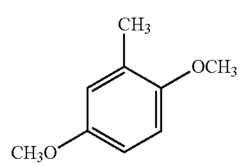

2,5-Dimethoxytoluene (obtained from Tokyo Chemical Industry Co., Ltd.)

-continued

[Compound 17]

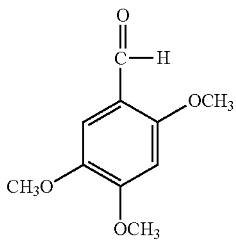

2,4,5-Trimethoxybenzaldehyde (obtained from Tokyo Chemical Industry Co., Ltd.)

[Compound 18]

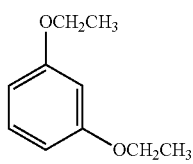

1,3-Diethoxybenzene (obtained from Tokyo Chemical Industry Co., Ltd.)

[Compound 19]

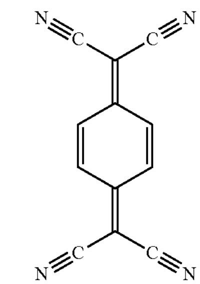

Tetracyanoquinodimethane (obtained from Tokyo Chemical Industry Co., Ltd.)

[Compound 20]

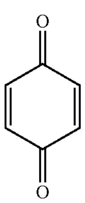

1,4-Benzoquinone (obtained from Tokyo Chemical Industry Co. Ltd.)

[Compound 21]

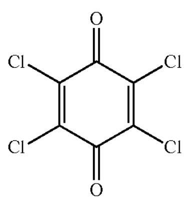

Chloranil (obtained from Tokyo Chemical Industry Co., Ltd.)

-continued

[Compound 22]

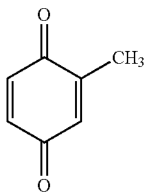

p-Toloquinone (obtained from Tokyo Chemical Industry Co., Ltd.)

[Compound 23]

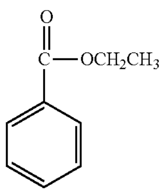

Ethyl benzoate (obtained from Tokyo Chemical Industry Co., Ltd.)

[Compound 24]

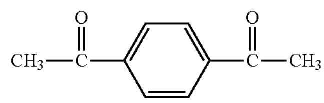

1,4-Diacetylbenzene (obtained from Tokyo Chemical Industry Co., Ltd.)

[Compound 25]

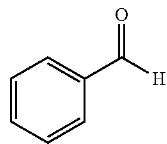

Benzaldehyde (obtained from Tokyo Chemical Industry Co., Ltd.)

[Compound 26]

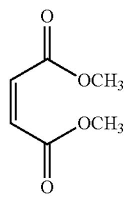

Dimethyl maleate (obtained from Tokyo Chemical Industry Co., Ltd.)

[Compound 27]

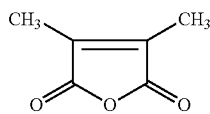

2,3-Dimethylmaleic anhydride (obtained from Tokyo Chemical Industry Co., Ltd.)

-continued

[Compound 28]

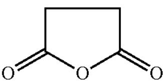

Succinic anhydride (obtained from Tokyo Chemical Industry Co., Ltd.)

[Compound 29]

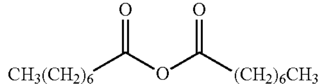

n-Octanoic anhydride (obtained from Tokyo Chemical Industry Co., Ltd.)

[Compound 30]

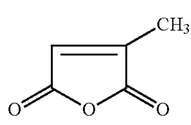

Citraconic anhydridge (obtained from Tokyo Chemical Industry Co., Ltd.)

As the device for electrochemical measurement and the cell for measurement, the same ones as used in the measurement of the electrochromic compounds were used. The measuring method for measuring the oxidation-reduction potentials was the CV method, which was the same as the method for measuring the electrochromic compounds. The reversibility of the oxidation-reduction reactions was evaluated by a double-step chronoamperometry (DSCA) method of stepping potentials higher or lower than the oxidation-reduction potential.

For evaluation of the oxidation-reduction potentials, the oxidation-reduction potentials were calculated based on a half-wave potential, which was the middle point between the peak potential of the oxidation current and the peak potential of the reduction current according to the CV method. For any substance of which oxidation-reduction current when returning to the initial state did not have a peaked shape because the oxidation-reduction reaction of the substance was irreversible, the potential at which the oxidation-reduction current rose was defined as the oxidation-reduction potential of the substance. The oxidation potentials of the oxidizable substances and the compound A were compared with each other, and the reduction potentials of the reducible substances and the compound B were compared with each other.

For evaluation of the oxidation-reduction reactions, the current ratio according to the DSCA method was used. According to the DSCA method, for example, when the measurement target is a substance that undergoes an oxidation reaction and the oxidation reaction of the substance is reversible, it is known that the ratio between an oxidation current $i_{ox}$ obtained by constant potential stepping for oxidation reaction and a reduction current $i_{red}$ obtained by constant potential stepping for promoting reduction reaction of the oxidized body produced through the former stepping is expressed by Formula (1) below.

$$\frac{-i_{red}}{i_{ox}} = 1 - \left(1 - \frac{\tau}{t}\right)^{\frac{1}{2}} \quad \text{Formula (1)}$$

In Formula (1) above, t represents a measurement time, and z represents the time for which constant potential stepping for oxidation reaction was performed. When the times for which both of the constant potential steppings are performed are the same, the ratio between the oxidation current and the reduction current is 0.29. When the oxidation-reduction reaction is irreversible, this current ratio becomes smaller. When the oxidized body does not return to the initial state at all, this constant ratio becomes 0.

Here, when this current ratio is less than or equal to 0.145, which is 1/2 of 0.29, the oxidation-reduction reaction is defined as being irreversible.

The results of the electrochemical measurement are presented in Table 1.

TABLE 1

| | | Kind of reaction | Oxidation-reduction potential Measured value (V) | Oxidation-reduction potential Comparison with EC compound | Reversibility |
|---|---|---|---|---|---|
| Oxidizable compound | Compound 1 | Oxidation | 0.05 | Base | Reversible |
| | Compound 2 | | 0.28 | Base | Reversible |
| | Compound 3 | | 0.73 | Noble | Irreversible |
| | Compound 4 | | 0.11 | Base | Irreversible |
| | Compound 5 | | 0.72 | Noble | Reversible |
| | Compound 6 | | 0.65 | Noble | Reversible |
| | Compound 7 | | 1.01 | Noble | Irreversible |
| | Compound 8 | | 1.54 | Noble | Irreversible |
| | Compound 9 | | 1.12 | Noble | Irreversible |
| | Compound 10 | | 0.74 | Noble | Irreversible |
| | Compound 11 | | 1.40 | Noble | Irreversible |
| | Compound 12 | | 1.32 | Noble | Irreversible |
| | Compound 13 | | 0.75 | Noble | Irreversible |
| | Compound 14 | | 0.81 | Noble | Irreversible |
| | Compound 15 | | 0.86 | Noble | Irreversible |
| | Compound 16 | | 0.69 | Noble | Irreversible |
| | Compound 17 | | 0.61 | Noble | Irreversible |
| | Compound 18 | | 0.90 | Noble | Irreversible |
| Reducible compound | Compound 19 | Reduction | −0.26 | Noble | Reversible |
| | Compound 20 | | −0.98 | Base | Reversible |
| | Compound 21 | | −0.45 | Noble | Reversible |
| | Compound 22 | | −1.17 | Base | Reversible |
| | Compound 23 | | −2.69 | Base | Reversible |
| | Compound 24 | | −2.31 | Base | Reversible |
| | Compound 25 | | −1.96 | Base | Irreversible |
| | Compound 26 | | −1.82 | Base | Irreversible |
| | Compound 27 | | −1.54 | Base | Irreversible |
| | Compound 28 | | −1.22 | Base | Irreversible |
| | Compound 29 | | −1.39 | Base | Irreversible |
| | Compound 30 | | −1.62 | Base | Irreversible |

Example 1

<Production of Oxidation-Type Electrochromic Element>

<<Production of Oxidizable Electrochromic Layer>>

A solution having the composition described below was prepared in order to form an oxidizable electrochromic layer over a first electrode.

[Composition]

Oxidizable electrochromic compound: Compound A (50 parts by mass)

Ion conductive material: PEG400DA (obtained from Nippon Kayaku Co., Ltd.) (50 parts by mass)

Polymerization initiator: IRGACURE184 (obtained from BASF GmbH) (5 parts by mass)

Solvent: Methyl ethyl ketone (900 parts by mass)

An ITO glass substrate (40 mm×40 mm, with a thickness of 0.7 mm, and an ITO film thickness of about 100 nm) serving as a first electrode was coated with the obtained solution by a spin coating method. The obtained coating film was irradiated at 10 mW for 60 seconds using a UV irradiator (SPOT CURE, obtained from Ushio Inc.) and annealed at 60 degrees C. for 10 minutes, to form an oxidizable electrochromic layer having an average thickness of 1.3 micrometers.

<<Production of Anti-Deterioration Layer>>

An ITO glass substrate (40 mm×40 mm, with a thickness of 0.7 mm, and an ITO film thickness of about 100 nm) serving as a second electrode was coated by a spin coating method with a titanium oxide nanoparticle dispersion liquid (product name: SP210, obtained from Showa Titanium Co., Ltd., with an average particle diameter of about 20 nm) as an anti-deterioration layer, and annealed at 120 degrees C. for 15 minutes, to produce an anti-deterioration layer formed of a titanium oxide particle film having a thickness of 1.0 micrometer.

<<Formation of Electrolyte Layer>>

BLEMMER AME400 (obtained from NOF Corporation) (195 parts by weight) and BLEMMER ADE400A (obtained from NOF Corporation) (195 parts by weight) serving as monomers, IRGACURE 184 (obtained from BASF GmbH) (10 parts by weight) serving as a polymerization initiator, ethyl methyl imidazolium bisfluorosulfonimide (product name: EMIMF SI, obtained from Kanto Chemical Co., Inc.) (600 parts by weight) serving as an ionic liquid, and the compound 3 (50 parts by weight) serving as an oxidizable substance were mixed, to obtain a monomer composition liquid. The obtained monomer composition liquid was weighed out by 30 mg with a micropipette, and dropped onto the ITO glass substrate having the anti-deterioration layer, to obtain an electrolyte layer formed of the monomer composition liquid.

<<Production of Electrochromic Element>>

The ITO glass substrate having the electrochromic layer and the ITO glass substrate having the anti-deterioration layer and the electrolyte layer were pasted together in a manner that the electrochromic layer and the electrolyte layer would contact each other, to obtain a pasted element.

The obtained pasted element was irradiated with UV (with a wavelength of 250 nm) at 10 mW for 60 seconds using a UV irradiator (product name: SPOT CURE, obtained from Ushio Inc.), to produce an electrochromic element of Example 1.

Examples 2 to 13

Electrochromic elements of Examples 2 to 13 were produced in the same manner as in Example 1, except that unlike in Example 1, the oxidizable substance in the electrolyte layer was changed to the compounds presented in Table 2 respectively.

Comparative Example 1

An electrochromic element of Comparative Example 1 was produced in the same manner as in Example 1, except that unlike in Example 1, no oxidizable substance was added in the electrolyte layer.

Comparative Examples 2 to 6

Electrochromic elements of Comparative Examples 2 to 6 were produced in the same manner as in Example 1, except that unlike in Example 1, the oxidizable substance in the electrolyte layer was changed to the compounds presented in Table 2 respectively.

<Evaluation of Oxidation-Type Electrochromic Elements>

The memory performance, color remaining, and the color developing density of the electrochromic elements (oxidation-type electrochromic elements) of Examples 1 to 13 and Comparative Examples 1 to 6 were evaluated. The threshold voltage Vc of the oxidation-type electrochromic elements of Examples was 1.0 V. In the following evaluations, the color developing voltage of the elements was set to 1.2 V in order to obtain a sufficient color development. The evaluation results are presented in Table 2.

<Evaluation of Memory Performance>

A constant voltage of 1.2 V was applied to each obtained electrochromic element for five seconds, and the circuit was opened subsequently. The absorbance of the electrochromic element at 730 nm was measured immediately after the circuit was opened and 30 minutes after the start of opening of the circuit using an optical spectroscope (product name: USB4000, obtained from Ocean Optics, Inc.).

Any electrochromic element that successfully maintained higher than or equal to 50% of the absorbance, which changed in response to the application of the constant voltage, when 30 minutes passed was rated A, and any electrochromic element that failed to do so was rated B.

<Evaluation of Color Remaining>

A constant voltage of 1.2 V was applied for five seconds, and then as a voltage applying step P2, a constant voltage of −1.0 V was applied for five seconds. P1 and P2 were alternately repeated a hundred times.

After the hundred times of repetition, whether color remaining of the electrochromic compound occurred or not was visually confirmed.

Any electrochromic element that had color remaining was rated B, and any electrochromic element that had no color remaining was rated A.

<Color Developing Density>

A constant voltage of 1.2 V was applied for five seconds to the electrochromic element that had no color remaining in the evaluation of color remaining, and immediately subsequently, the absorbance at 730 nm was measured, to evaluate the influence on the color developing density by removal of color remaining.

Any electrochromic element that successfully maintained higher than or equal to 50% of the absorbance before the evaluation of color remaining was rated A, and any electrochromic element that failed to do so was rated B. Any electrochromic element that had color remaining was rated -, because such an electrochromic element was unevaluable.

TABLE 2

| | Oxidation-type electrochromic element | | | | Evaluation results | | |
|---|---|---|---|---|---|---|---|
| | Oxidizable substance compound No. | Kind of reaction | Comparison with potential of oxidizable EC compound | Reversibility | Memory performance | Color remaining | Color developing density |
| Ex. 1 | Compound 3 | Oxidation | Noble | Irreversible | A | A | A |
| Ex. 2 | Compound 7 | | | | A | A | A |
| Ex. 3 | Compound 8 | | | | A | A | A |
| Ex. 4 | Compound 9 | | | | A | A | A |
| Ex. 5 | Compound 10 | | | | A | A | A |
| Ex. 6 | Compound 11 | | | | A | A | A |
| Ex. 7 | Compound 12 | | | | A | A | A |
| Ex. 8 | Compound 13 | | | | A | A | A |
| Ex. 9 | Compound 14 | | | | A | A | A |
| Ex. 10 | Compound 15 | | | | A | A | A |
| Ex. 11 | Compound 16 | | | | A | A | A |
| Ex. 12 | Compound 17 | | | | A | A | A |
| Ex. 13 | Compound 18 | | | | A | A | A |
| Comp. Ex. 1 | Absent | — | — | — | A | B | — |
| Comp. Ex. 2 | Compound 4 | Oxidation | Base | Irreversible | B | B | — |
| Comp. Ex. 3 | Compound 2 | | Base | Reversible | B | A | B |

TABLE 2-continued

| | Oxidation-type electrochromic element | | | | | | |
|---|---|---|---|---|---|---|---|
| | Oxidizable substance compound No. | Kind of reaction | Comparison with potential of oxidizable EC compound | Reversibility | Evaluation results: Memory performance | Color remaining | Color developing density |
| Comp. Ex. 4 | Compound 1 | | Base | | B | A | B |
| Comp. Ex. 5 | Compound 5 | | Noble | | A | D | — |
| Comp. Ex. 6 | Compound 6 | | Noble | | A | B | — |

Example 14

<Production of Reduction-Type Electrochromic Element>

<<Formation of Anti-Deterioration Layer>>

A first electrode was spin-coated with a TFP dispersion liquid of an aqueous polyurethane resin and ATO nanoparticles (obtained from Mitsubishi Materials Corporation), and annealed at 120 degrees C. for 15 minutes, to form an anti-deterioration layer.

<<Production of Reducible Electrochromic Layer>>

An ITO glass substrate (40 mm×40 mm, with a thickness of 0.7 mm, and an ITO film thickness of about 100 nm) serving as a second electrode was coated by a spin coating method with a titanium oxide nanoparticle dispersion liquid (product name: SP210, obtained from Showa Titanium Co., Ltd., with an average particle diameter of about 20 nm). Then, the resultant was annealed at 120 degrees C. for 15 minutes, to form a nanostructure semiconductor material formed of a titanium oxide particle film having a thickness of about 1.0 micrometers.

Next, the obtained titanium oxide particle film was coated by a spin coating method with a 2,2,3,3-tetrafluoropropanol (hereinafter, abbreviated as "TFP") solution containing 1% by mass of a compound B, which was a reducible electrochromic compound represented by Structural formula below. Then, the resultant was annealed at 120 degrees C. for 10 minutes.

In the way described above, a reducible electrochromic layer formed of the titanium oxide particle film and the reducible electrochromic compound was formed.

[Compound B]

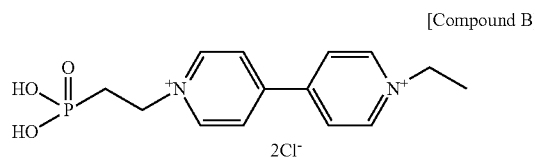 [SMILES: CC[n+]1ccc(-c2cc[n+](CCP(=O)(O)O)cc2)cc1]

<<Production of Electrolyte Layer>>

An electrolyte layer was formed in the same manner as in Example 1, except that the oxidizable substance in the electrolyte layer of the oxidation-type electrochromic element of Example 1 was changed to the compound 25, which was a reducible substance.

<<Production of Electrochromic Element>>

An electrochromic element of Example 14 was produced in the same manner as the oxidation-type electrochromic element of Example 1.

Examples 15 to 19

Electrochromic elements of Examples 15 to 19 were produced in the same manner as in Example 14, except that unlike in Example 14, the reducible substance in the electrolyte layer was changed to the compounds presented in Table 3.

Comparative Example 7

An electrochromic element of Comparative Example 7 was produced in the same manner as in Example 14, except that unlike in Example 14, no reducible substance was added in the electrolyte layer.

Comparative Examples 8 to 13

Electrochromic elements of Comparative Examples 8 to 13 were produced in the same manner as in Example 14, except that unlike in Example 14, the oxidizable substance in the electrolyte layer was changed to the compounds presented in Table 3.

<Evaluation of Reduction-Type Electrochromic Element>

The memory performance, color remaining, and the color developing density of the electrochromic elements (reduction-type electrochromic elements) of Examples 14 to 19 and Comparative Examples 7 to 13 were evaluated. The threshold voltage Vc of the reduction-type electrochromic elements of Examples was 0.5 V. In the following evaluations, the color developing voltage of the elements was set to 2.0 V in order to obtain a sufficient color development. The evaluation results are presented in Table 3.

<Evaluation of Memory Performance>

A constant voltage of 2.0 V was applied to each obtained electrochromic element for five seconds, and the circuit was opened subsequently. The absorbance of the electrochromic element at 610 nm was measured immediately after the circuit was opened and 30 minutes after the start of opening of the circuit using an optical spectroscope (product name: USB4000, obtained from Ocean Optics, Inc.).

Any electrochromic element that successfully maintained higher than or equal to 50% of the absorbance, which changed in response to the application of the constant voltage, when 30 minutes passed was rated A, and any electrochromic element that failed to do so was rated B.

<Evaluation of Color Remaining>

A constant voltage of 2.0 V was applied to the obtained electrochromic element for five seconds in the voltage applying step P1, and then a constant voltage of −1.0 V was applied to the electrochromic element for five seconds in the voltage applying step P2. P1 and P2 were alternately repeated a hundred times.

After the hundred times of repetition, whether color remaining of the electrochromic compound occurred or not was visually confirmed.

Any electrochromic element that had color remaining was rated B, and any electrochromic element that had no color remaining was rated A.

<Color Developing Density>

A constant voltage of 1.2 V was applied for five seconds to the electrochromic element that had no color remaining in the evaluation of color remaining, and the absorbance at 610 nm was measured immediately subsequently, to evaluate the influence on the color developing density by removal of color remaining.

Any electrochromic element that successfully maintained higher than or equal to 50% of the absorbance before the evaluation of color remaining was rated A, and any electrochromic element that failed to do so was rated B. Any electrochromic element that had color remaining was rated -, because such an electrochromic element was unevaluable.

glass substrate having the reducible electrochromic layer to obtain an electrolyte layer formed of the monomer composition liquid.

<<Production of Electrochromic Element>>

The ITO glass substrate having the oxidizable electrochromic layer and the ITO glass substrate having the reducible electrochromic layer and the electrolyte layer were pasted together in a manner that the oxidizable electrochromic layer and the electrolyte layer would contact each other, to obtain a pasted element.

The obtained pasted element was irradiated with UV (with a wavelength of 250 nm) at 10 mW for 60 seconds using a UV irradiator (product name: SPOT CURE, obtained from Ushio Inc.), to produce an electrochromic element of Example 20.

Example 21

An electrochromic element of Example 21 was produced in the same manner as in Example 20 except that unlike in Example 20, the oxidizable substance was changed to a reducible substance presented in Tables 4 to 6.

TABLE 3

| | Reduction-type electrochromic element | | | | Evaluation results | | |
|---|---|---|---|---|---|---|---|
| | Reducible substance compound No. | Kind of reaction | Comparison with potential of reducible EC compound | Reversibility | Memory performance | Color remaining | Color developing density |
| Ex. 14 | Compound 25 | Reduction | Base | Irreversible | A | A | A |
| Ex. 15 | Compound 26 | | | | A | A | A |
| Ex. 16 | Compound 27 | | | | A | A | A |
| Ex. 17 | Compound 28 | | | | A | A | A |
| Ex. 18 | Compound 29 | | | | A | A | A |
| Ex. 19 | Compound 30 | | | | A | A | A |
| Comp. Ex. 7 | Absent | — | — | — | A | B | — |
| Comp. Ex. 8 | Compound 19 | Reduction | Noble | Reversible | B | A | B |
| Comp. Ex. 9 | Compound 20 | | Base | | A | B | — |
| Comp. Ex. 10 | Compound 21 | | Noble | | B | A | B |
| Comp. Ex. 11 | Compound 22 | | Base | | A | B | — |
| Comp. Ex. 12 | Compound 23 | | Noble | | B | A | B |
| Comp. Ex. 13 | Compound 24 | | Noble | | B | A | B |

Example 20

<Production of Complementary Electrochromic Element>

An oxidizable electrochromic layer was formed over a first electrode in the same manner as in Example 1.

A reducible electrochromic layer was formed over a second electrode in the same manner as in Example 14.

<<Production of Electrolyte Layer>>

BLEMMER AME400 (obtained from NOF Corporation) (195 parts by weight) and BLEMMER ADE400A (obtained from NOF Corporation) (195 parts by weight), IRGACURE 184 (obtained from BASF GmbH) (10 parts by weight) serving as a polymerization initiator, ethyl methyl imidazolium bisfluorosulfonimide (product name: EMIMFSI, obtained from Kanto Chemical Co., Inc.) (600 parts by weight) serving as an ionic liquid, and the compound 3 (50 parts by weight) serving as an oxidizable substance were mixed, to obtain a monomer composition liquid.

Next, the monomer composition liquid was weighed out by 30 mg with a micropipette, and dropped onto the ITO

Example 22

An electrochromic element of Example 22 was produced in the same manner as in Example 20 except that unlike in Example 20, the compound 25 (50 parts by weight) was added in the electrolyte layer as a reducible substance.

Comparative Example 14

An electrochromic element of Comparative Example 14 was produced in the same manner as in Example 20 except that unlike in Example 20, neither an oxidizable substance nor a reducible substance was added in the electrolyte layer.

Comparative Examples 15 to 17

Electrochromic elements of Comparative Examples 15 to 17 were produced in the same manner as in Example 20 except that unlike in Example 20, the oxidizable substance in the electrolyte layer was changed to the compounds presented in Tables 4 to 6 respectively.

Comparative Examples 18 and 19

Electrochromic elements of Comparative Examples 18 and 19 were produced in the same manner as in Example 21 except that unlike in Example 21, the reducible substance in the electrolyte layer was changed to the compounds presented in Tables 4 to 6 respectively.

Comparative Examples 20 to 24

Electrochromic elements of Comparative Examples 20 to 24 were produced in the same manner as in Example 22 except that unlike in Example 22, the oxidizable substance or the reducible substance in the electrolyte layer was changed to the compounds presented in Tables 4 to 6 respectively.

<Evaluation of Complementary Electrochromic Element>

The threshold voltage Vc of the complementary electrochromic elements of Examples was 1.1 V. In the following evaluations, the color developing voltage of the elements was set to 1.5 V in order to obtain a sufficient color development.

<Evaluation of Memory Performance>

A constant voltage of 1.5 V was applied to each obtained complementary electrochromic element for five seconds, and the circuit was opened subsequently. The absorbance of the electrochromic element at 610 nm was measured immediately after the circuit was opened and 30 minutes after the start of opening of the circuit using an optical spectroscope (product name: USB4000, obtained from Ocean Optics, Inc.).

Any electrochromic element that successfully maintained higher than or equal to 50% of the absorbance, which changed in response to the application of the constant voltage, when 30 minutes passed was rated A, and any electrochromic element that failed to do so was rated B.

<<Evaluation 1: Color Remaining>>

Color remaining of the electrochromic elements (complementary electrochromic elements) of Examples 20, Example 22, Comparative Examples 14 to 17, and Comparative Examples 20 to 24 was evaluated.

A constant voltage of 1.5 V was applied to the obtained electrochromic element for five seconds in the voltage applying step P1 and then a constant voltage of −1.0 V was applied to the electrochromic element for five seconds in the voltage applying step P2. P1 and P2 were alternately repeated a hundred times.

After the hundred times of repetition, whether color remaining of the electrochromic compound occurred or not was visually confirmed. The evaluation results are presented in Tables 4 to 6.

Any electrochromic element that had color remaining was rated B, and any electrochromic element that had no color remaining was rated A.

Comparative Example 14 in which neither an oxidizable substance nor a reducible substance was added had color remaining due to the oxidizable electrochromic compound in this evaluation. On the other hand, Examples 20 and 22 in which an oxidizable substance was added were able to overcome color remaining that occurred in Comparative Example 14.

<<Evaluation 2: Color>>

After the operation of Evaluation 1: color remaining, a voltage of 1.5 V was applied for five seconds, to visually confirm the color of the EC element.

Any EC element that had the same color as before the repetition was rated A, and any EC element that had a different color was rated B. The evaluation results are presented in Tables 4 to 6.

<<Evaluation 3: Color Remaining>>

Color remaining of the electrochromic elements (complementary electrochromic elements) of Examples 21 and 22, and Comparative Examples 18 to 24 was evaluated in the manner described below.

A constant voltage of 1.5 V was applied to the obtained electrochromic element for five seconds in the voltage applying step P1 and then a constant voltage of −1.0 V was applied to the electrochromic element for five seconds in the voltage applying step P2. P1 and P2 were alternately repeated a hundred times. Here, the electrochromic element was irradiated with pseudo sunlight using a xenon tester (Q-SUN XE-1, obtained from Q-Lab Corporation).

After the hundred times of repetition with irradiation with pseudo sunlight, whether color remaining of the electrochromic compound occurred or not was visually confirmed. Any electrochromic element that had color remaining was rated B and any electrochromic element that had no color remaining was rated A. The evaluation results are presented in Tables 4 to 6.

Comparative Example 14 in which neither an oxidizable substance nor a reducible substance was added had color remaining due to the reducible electrochromic compound in this evaluation. On the other hand, Examples 21 and 22 in which a reducible substance was added was able to overcome color remaining that occurred in Comparative Example 14.

<<Evaluation 4: Color>>

After Evaluation 3: color remaining, a voltage of 1.5 V was applied for five seconds, to confirm the color of the EC element.

Any EC element that had the same color as before the repetition was rated A, and any EC element that had a different color was rated B. The evaluation results are presented in Tables 4 to 6.

TABLE 4

| | | Ex. 20 | Ex. 21 | Ex. 22 |
|---|---|---|---|---|
| Oxidizable substance | Oxidizable substance compound No. | Compound 3 | — | Compound 3 |
| | Kind of reaction | Oxidation | | Oxidation |
| | Comparison with potential of oxidizable EC compound | Noble | | Noble |
| | Reversibility | Irreversible | | Irreversible |

TABLE 4-continued

| | | Ex. 20 | Ex. 21 | Ex. 22 |
|---|---|---|---|---|
| Reducible substance | Reducible substance compound No. | — | Compound 25 | Compound 25 |
| | Kind of reaction | | Reduction | Reduction |
| | Comparison with potential of reducible EC compound | | Base | Base |
| | Reversibility | | Irreversible | Irreversible |
| Evaluation results | Memory performance | A | A | A |
| | Evaluation 1 color remaining | A | — | A |
| | Evaluation 2 color | A | — | A |
| | Evaluation 3 color remaining | — | A | A |
| | Evaluation 4 color | — | A | A |

TABLE 5

| | | Comp. Ex. 14 | Comp. Ex. 15 | Comp. Ex. 16 | Comp. Ex. 17 | Comp. Ex. 18 | Comp. Ex. 19 |
|---|---|---|---|---|---|---|---|
| Oxidizable substance | Oxidizable substance compound No. | — | Compound 4 | Compound 2 | Compound 5 | — | — |
| | Kind of reaction | | Oxidation | Oxidation | Oxidation | | |
| | Comparison with potential of oxidizable EC compound | | Base | Base | Noble | | |
| | Reversibility | | Irreversible | Reversible | Reversible | | |
| Reducible substance | Reducible substance compound No. | — | — | — | — | Compound 19 | Compound 20 |
| | Kind of reaction | | | | | Reduction | Reduction |
| | Comparison with potential of reducible EC compound | | | | | Noble | Base |
| | Reversibility | | | | | Reversible | Reversible |
| Evaluation results | Memory performance | A | B | B | A | B | A |
| | Evaluation 1 color remaining | B Oxidation side | B Reduction side | B Reduction side | A | — | — |
| | Evaluation 2 color | B | B | B | B | — | — |
| | Evaluation 3 color remaining | B Reduction side | — | — | — | B Oxidation side | A |
| | Evaluation 4 color | B | — | — | — | B | B |

TABLE 6

| | | Comp. Ex. 20 | Comp. Ex. 21 | Comp. Ex. 22 | Comp. Ex. 23 | Comp. Ex. 24 |
|---|---|---|---|---|---|---|
| Oxidizable substance | Oxidizable substance compound No. | Compound 4 | Compound 5 | Compound 3 | Compound 5 | Compound 1 |
| | Kind of reaction | Oxidation | Oxidation | Oxidation | Oxidation | Oxidation |
| | Comparison with potential of oxidizable EC compound | Base | Noble | Noble | Noble | Base |
| | Reversibility | Irreversible | Reversible | Irreversible | Reversible | Reversible |

TABLE 6-continued

| | | Comp. Ex. 20 | Comp. Ex. 21 | Comp. Ex. 22 | Comp. Ex. 23 | Comp. Ex. 24 |
|---|---|---|---|---|---|---|
| Reducible substance | Reducible substance compound No. | Compound 25 | Compound 25 | Compound 20 | Compound 20 | Compound 19 |
| | Kind of reaction | Reduction | Reduction | Reduction | Reduction | Reduction |
| | Comparison with potential of reducible EC compound | Base | Base | Base | Base | Noble |
| | Reversibility | Irreversible | Irreversible | Reversible | Reversible | Reversible |
| Evaluation results | Memory performance | B | A | A | A | B |
| | Evaluation 1 color remaining | A | A | A | A | A |
| | Evaluation 2 color | B | B | B | B | B |
| | Evaluation 3 color remaining | A | A | A | A | A |
| | Evaluation 4 color | B | B | B | B | B |

Aspects of the present disclosure are, for example, as follows.

<1> An electrochromic element including:

a first electrode;

a second electrode apart from and opposite to the first electrode;

an electrolyte layer between the first electrode and the second electrode, the electrolyte layer containing an oxidizable substance or a reducible substance, or both;

an oxidizable electrochromic layer between the first electrode and the electrolyte layer, the oxidizable electrochromic layer containing an oxidizable electrochromic compound; and a reducible electrochromic layer between the second electrode and the electrolyte layer, the reducible electrochromic layer containing a reducible electrochromic compound, wherein an oxidation potential of the oxidizable substance is nobler than an oxidation potential of the oxidizable electrochromic compound, a reduction potential of the reducible substance is baser than a reduction potential of the reducible electrochromic compound, an oxidation reaction of the oxidizable substance is irreversible, and a reduction reaction of the reducible substance is irreversible.

<2> The electrochromic element according to <1>, wherein one or both of the oxidizable substance and the reducible substance is colorless and transparent.

<3> The electrochromic element according to <1> or <2>, wherein the oxidizable substance is at least one selected from the group consisting of phenols, alkoxy benzenes, cyano benzenes, phosphites, phosphates, and annulenes.

<4> The electrochromic element according to any one of <1> to <3>, wherein the reducible substance is at least one selected from the group consisting of acid anhydrides, aromatic ketones, and unsaturated fatty acid esters.

<5> The electrochromic element according to any one of <1> to <4>, wherein the oxidizable electrochromic compound is a triarylamine derivative.

<6> An electrochromic element including:

a first electrode;

a second electrode apart from and opposite to the first electrode;

an electrolyte layer between the first electrode and the second electrode, the electrolyte layer containing an oxidizable substance; and an oxidizable electrochromic layer between the first electrode and the electrolyte layer, the oxidizable electrochromic layer containing an oxidizable electrochromic compound, wherein an oxidation potential of the oxidizable substance is nobler than an oxidation potential of the oxidizable electrochromic compound, and an oxidation reaction of the oxidizable substance is irreversible.

<7> The electrochromic element according to <6>, wherein the oxidizable substance is colorless and transparent.

<8> The electrochromic element according to <6> or <7>, wherein the oxidizable substance is at least one selected from the group consisting of phenols, alkoxy benzenes, cyano benzenes, phosphites, phosphates, and annulenes.

<9> The electrochromic element according to any one of <6> to <8>, wherein the oxidizable electrochromic compound is a triarylamine derivative.

<10> An electrochromic element including:

a first electrode;

a second electrode apart from and opposite to the first electrode;

an electrolyte layer between the first electrode and the second electrode, the electrolyte layer containing a reducible substance; and a reducible electrochromic layer between the second electrode and the electrolyte layer, the reducible electrochromic layer containing a reducible electrochromic compound, wherein a reduction potential of the reducible substance is baser than a reduction potential of the reducible electrochromic compound, and a reduction reaction of the reducible substance is irreversible.

<11> The electrochromic element according to <10>, wherein the reducible substance is colorless and transparent.

<12> The electrochromic element according to <10> or <11>, wherein the reducible substance is at least one selected from the group consisting of acid anhydrides, aromatic ketones, and unsaturated fatty acid esters.

<13> A method for driving an electrochromic element, the method including:

applying to the electrochromic element, a voltage higher than a threshold voltage Vc needed for the electrochromic element to change from an initial state to a color changed state; and applying to the electrochromic element, a voltage of an opposite polarity to the threshold voltage Vc, wherein the electrochromic element includes:

a first electrode;

a second electrode apart from and opposite to the first electrode;

an electrolyte layer between the first electrode and the second electrode, the electrolyte layer containing an oxidizable substance or a reducible substance, or both;

an oxidizable electrochromic layer between the first electrode and the electrolyte layer, the oxidizable electrochromic layer containing an oxidizable electrochromic compound; and a reducible electrochromic layer between the second electrode and the electrolyte layer, the reducible electrochromic layer containing a reducible electrochromic compound.

<14> A method for driving an electrochromic element, the method including:

applying to the electrochromic element, a voltage higher than a threshold voltage Vc needed for the electrochromic element to change from an initial state to a color changed state; and applying to the electrochromic element, a voltage of an opposite polarity to the threshold voltage Vc, wherein the electrochromic element includes:

a first electrode;

a second electrode apart from and opposite to the first electrode;

an electrolyte layer between the first electrode and the second electrode, the electrolyte layer containing an oxidizable substance; and an oxidizable electrochromic layer between the first electrode and the electrolyte layer, the oxidizable electrochromic layer containing an oxidizable electrochromic compound.

<15> A method for driving an electrochromic element, the method including:

applying to the electrochromic element, a voltage higher than a threshold voltage Vc needed for the electrochromic element to change from an initial state to a color changed state; and applying to the electrochromic element, a voltage of an opposite polarity to the threshold voltage Vc, wherein the electrochromic element includes:

a first electrode;

a second electrode apart from and opposite to the first electrode;

an electrolyte layer between the first electrode and the second electrode, the electrolyte layer containing a reducible substance; and a reducible electrochromic layer between the second electrode and the electrolyte layer, the reducible electrochromic layer containing a reducible electrochromic compound between the second electrode and the electrolyte layer.

The electrochromic element according to any one of <1> to <12> and the method for driving an electrochromic element according to any one of <13> to <15> can solve the various problems in the related art and achieve the object of the present disclosure.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An electrochromic element comprising:

a first electrode;

a second electrode apart from and opposite to the first electrode;

an electrolyte layer between the first electrode and the second electrode, the electrolyte layer containing an oxidizable substance or a reducible substance, or both;

an oxidizable electrochromic layer between the first electrode and the electrolyte layer, the oxidizable electrochromic layer containing an oxidizable electrochromic compound; and a reducible electrochromic layer between the second electrode and the electrolyte layer, the reducible electrochromic layer containing a reducible electrochromic compound, wherein an oxidation potential of the oxidizable substance is nobler than an oxidation potential of the oxidizable electrochromic compound, a reduction potential of the reducible substance is baser than a reduction potential of the reducible electrochromic compound, an oxidation reaction of the oxidizable substance is irreversible, a reduction reaction of the reducible substance is irreversible, the electrolyte layer is formed between the oxidizable electrochromic layer and the reducible electrochromic layer, the oxidizable substance is at least one selected from the group consisting of phenols, alkoxy benzenes, cyano benzenes, phosphites, phosphates, and annulenes, and the reducible substance is at least one selected from the group consisting of acid anhydrides, aromatic ketones, and unsaturated fatty acid esters.

2. The electrochromic element according to claim 1, wherein one or both of the oxidizable substance and the reducible substance is colorless and transparent.

3. The electrochromic element according to claim 1, wherein the oxidizable electrochromic compound is a triarylamine derivative.

4. A method for driving the electrochromic element according to claim 1, the method comprising:

applying to the electrochromic element, a voltage higher than a threshold voltage Vc needed for the electrochromic element to change from an initial state to a color changed state; and applying to the electrochromic element, a voltage of an opposite polarity to the threshold voltage Vc.

* * * * *